US004001708B2

United States Statutory Invention Registration [19]

[11] Reg. Number: H1708

Davidson et al.

[45] Published: Feb. 3, 1998

[54] SYSTEM FOR CREATING AND PRODUCING CUSTOM CARD PRODUCTS

[75] Inventors: Leonard Davidson, Los Angeles; H. Matthew Russell, Glendale; Michael S. Russell, Glendale; Scott K. Allred, Glendale, all of Calif.

[73] Assignee: CreataCard, Inc., Cleveland, Ohio

[21] Appl. No.: 798,676

[22] Filed: Nov. 26, 1991

Related U.S. Application Data

[63] Continuation-in-part of Ser. No. 679,263, Apr. 2, 1991, Pat. No. 5,615,123.

[51] Int. Cl.[6] ..... G06F 17/00

[52] U.S. Cl. ..... 364/479.01; 235/381; 340/825.35

[58] Field of Search ..... 364/478, 479, 364/468; 221/9; 414/793, 796; 395/100, 118, 144, 145, 146, 147

*Primary Examiner*—Bernarr E. Gregory

*Attorney, Agent, or Firm*—David B. Cochran; Jones, Day, Reavis & Pogue

[57] ABSTRACT

A method of and apparatus for creating and vending printed card products such as greeting cards is disclosed, whereby a customer can select a card product for a desired application and customize or personalize certain portions of the selected card product. A terminal area or kiosk is provided at which the customer selects from a monitor screen display one of a number of different selection criterion for which he/she wants to obtain a card product. There may be multiple levels of selection criteria. Upon entry of the selection via, e.g., a transparent touch-sensitive plate on the monitor screen, one or more pre-stored groups of card product design formats pertaining to the selected selection criterion are determined, and the customer is prompted to select a particular card format to customize. The card product designs may include separate graphics, text and spaces for insertion of customized user messages, and these elements may be stored in a compressed format. Further inquiries via the monitor screen elicit custom messages to be reproduced at designated locations in the format of the chosen card product. The customized card product is then created by, e.g., a multicolor ink plotter that is fed with specially prepared sheets of card stock, and vended to the customer.

61 Claims, 28 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MATCH TO FIG. 15b

SYSTEM FOR CREATING AND PRODUCING CUSTOM CARD PRODUCTS

RELATED APPLICATIONS

This is a continuation-in-part application of application Ser. No. 07/679,263 filed Apr. 2, 1991, now U.S. Pat. No. 5,615,123.

FIELD OF INVENTION

This invention relates to card products and, more particularly, to method and apparatus for vending printed card products such as greeting cards, posters, invitations, announcements, certificates and the like.

BACKGROUND OF THE INVENTION

Greeting cards and similar type products are usually sold in stores or shops that devote considerable floor space to the display of the cards. The printed cards are normally displayed in racks divided according to type, i.e., birthday cards, anniversary cards, Christmas cards, etc. Usually, the shop must stock several copies of most cards so that all cards are available for selection at all times. As a result, the shopkeeper must carry a large inventory often resulting in losses from cards that do not sell well or become out-of-date, out-of-stock or damaged. Customers must devote considerable time to selection of a greeting card from among the large inventory on display.

Efficient production of conventional greeting cards requires large print runs. A new card may require as much as 18 months to design the card format, to market-test the design and to approve the card for a print run. Because of the large print runs and long lead time, greeting cards are usually limited to general interest areas and styles that do not become dated. Printed greeting cards usually do not exist for short run items such as current event topics, regional events or other special events.

Attempts have been made to modernize the greeting card business through the use of computer controlled vending machines. For example, Hallmark in U.S. Pat. No. 5,036,472 entitled "Computer Controlled Machine For Vending Personalized Products or the Like" describes a greeting card vending machine where stacks of different partially printed cards are customized and then dispensed. The customer uses the computer keyboard to select from among the available pre-printed card formats and to insert personal messages or information to customize the partially pre-printed cards. An internal robot-like machine delivers the selected pre-printed card to a letter printer which adds the customized messages and then delivers the completed card to a delivery slot. In some commercial installations, Hallmark eliminates the robot-like machine and has the customer deliver the selected pre-printed card to the salesclerk for insertion into a printer for customization.

Another computerized system is described in U.S. Pat. No. 4,712,174 which generates pseudorandom text in the form of a greeting card. The system uses a conventional home computer configuration including a dot-matrix printer, monitor and conventional keyboard. Poetic text is pseudorandomly generated upon entry of a name, residence, gender, message or occasion, and primary and secondary traits. The message or occasion for the card is selected from among a number of possibilities displayed with a 3-letter identifier. Similar prompts are used for selecting primary and secondary traits. Once the prompted information is entered, a poem is displayed with a title. Alternative text can be displayed at the option of the customer. When approved, the selected poem is produced by the printer.

Broderbund Software Inc. markets a software package for use with home computers called "The New Print Shop". The user can use the keyboard and main display menu to select from among a number of pre-stored objects such as a birthday cake or Christmas tree, and locate these objects to compose a card. In some instances "ready made" cards are available. The front of a chosen card is displayed first along with five menu choices respecting border, graphic, message, card inside, and customization. The inside of the card with message inserted is then displayed. The card can then be printed using a conventional printer.

SUMMARY OF THE INVENTION

An object of the present invention is to provide a vending system which (1) provides the ability to stock and display a virtually unlimited number of cards while using only a limited floor space, (2) avoids purchasing losses arising from cards that do not sell well, become outdated or shop-worn, (3) avoids lost sales from being out-of-stock on "hot selling" items and (4) provides entertainment that attracts customers for cards and other products.

Another object of the invention is to provide a vending system capable of filling current market voids by economically providing capability of economically limited run current event cards as well as regional and special event cards or cards for lesser holidays.

Another object of the invention is to provide a vending system capable of carrying out the selection process in different languages and capable of economically providing cards in a number of different languages and with appeal to different ethnic groups.

Still another object of the invention is to provide a vending system permitting the customer to efficiently select from a very large inventory of possible greeting cards.

Yet another object of the invention is to provide a vending system which permits complete customization of a selected card format.

Another object is to provide a vending system capable of providing a virtually unlimited number of printed quality greeting cards from plain paper stock.

Another object is to provide a vending system with video display and audio for attracting customers and providing selection prompts.

The vending system according to the invention is built in the form of a vending terminal or kiosk which can be located within a shop, shopping mall or other suitable location. Visible to the customers, the kiosk includes a monitor with a keyboard or touch screen display, a delivery slot and a coin or credit card slot when desired. A computer is located inside the kiosk preferably including at least 4 megabytes addressable RAM (random access memory) and 100 megabytes hard disk capacity. The computer is coupled to peripheral devices through suitable I/O (input-output) interfaces for coupling to (1) a high resolution color monitor, (2) a touch screen associated with the monitor, (3) a coin or credit card slot, (4) a plain paper supply mechanism, (5) an audio system, and (6) a high quality color plotter or printer preferably providing at least 300 dpi (dots per inch) print quality.

The available card formats are stored in memory either as complete cards or as card fragments that can be assembled into a complete card. Since the system is intended to make a large number of high resolution card selection available using a modest sized computer, the graphic data is preferably stored in a compressed format which can be decompressed with little graphic loss. Also included in memory for each card format are the associated selection criteria including the general application categories such as birthdays, get well, Christmas, etc. and specific uses such as the relationships between the recipient and sender, interests of the recipient and the card type.

When not in use, the kiosk provides video displays and audio messages to attract customers or provide advertising. A block-by-block downloading scheme is used to permit extended audio messages. The potential customer is advised that there is no charge in using the machine to compose greeting cards and that the customer must pay only if satisfied with the card composition and desires a printed card. When using the machine the customer is first presented with a selection menu for a general application category such as, birthday, anniversary, get well or other special categories. The customer selects a general application using the touch screen. Depending on which general category was selected, the customer is next presented with one or more use selections appropriate for the general category to narrow down the card selection. The use selection can determine (1) relationship of the card recipient and sender, e.g., mother, sister, friend etc., (2) interests e.g. football, sports, cars, sewing, boys and (3) card type e.g., serious, funny, weird etc. When the use selections are made using the touch screen, the computer runs a sort program to determine which card formats correspond to the selected criteria. The card formats that satisfy the selected criteria are then displayed on the screen.

The customer again uses the touch screen to select a card format from among those displayed. The selected card format is displayed on the screen with an overlay indicating the type and location of possible customized inserts. The screen display next prompts the customer for insertion of customizing messages as appropriate for the selected card. The selected card format with the customized message inserts is then displayed. If the customer is satisfied with the card composition displayed on the screen, the customer can have the card printed and pay for the printed card.

The printed product from the vending machine is a folded card printed on both the front and back outside surfaces as well as at least one of the inside surfaces. In accordance with the invention, this is achieved by printing on one side of a plain sheet stock pre-scored and trimmed for a quarter fold (also referred to as a "French fold"). The horizontal and vertical pre-score lines are offset from the centerline to compensate for the paper thickness and one of the quarter panels is trimmed on the diagonal to facilitate edge alignment in the folded card.

DESCRIPTION OF THE DRAWINGS

The foregoing and other objects will become apparent from the following specification which sets forth illustrative embodiments of the invention. The drawings form part of the specification, wherein.

DETAILED DESCRIPTION OF A PREFERRED EMBODIMENT

Figure 1:
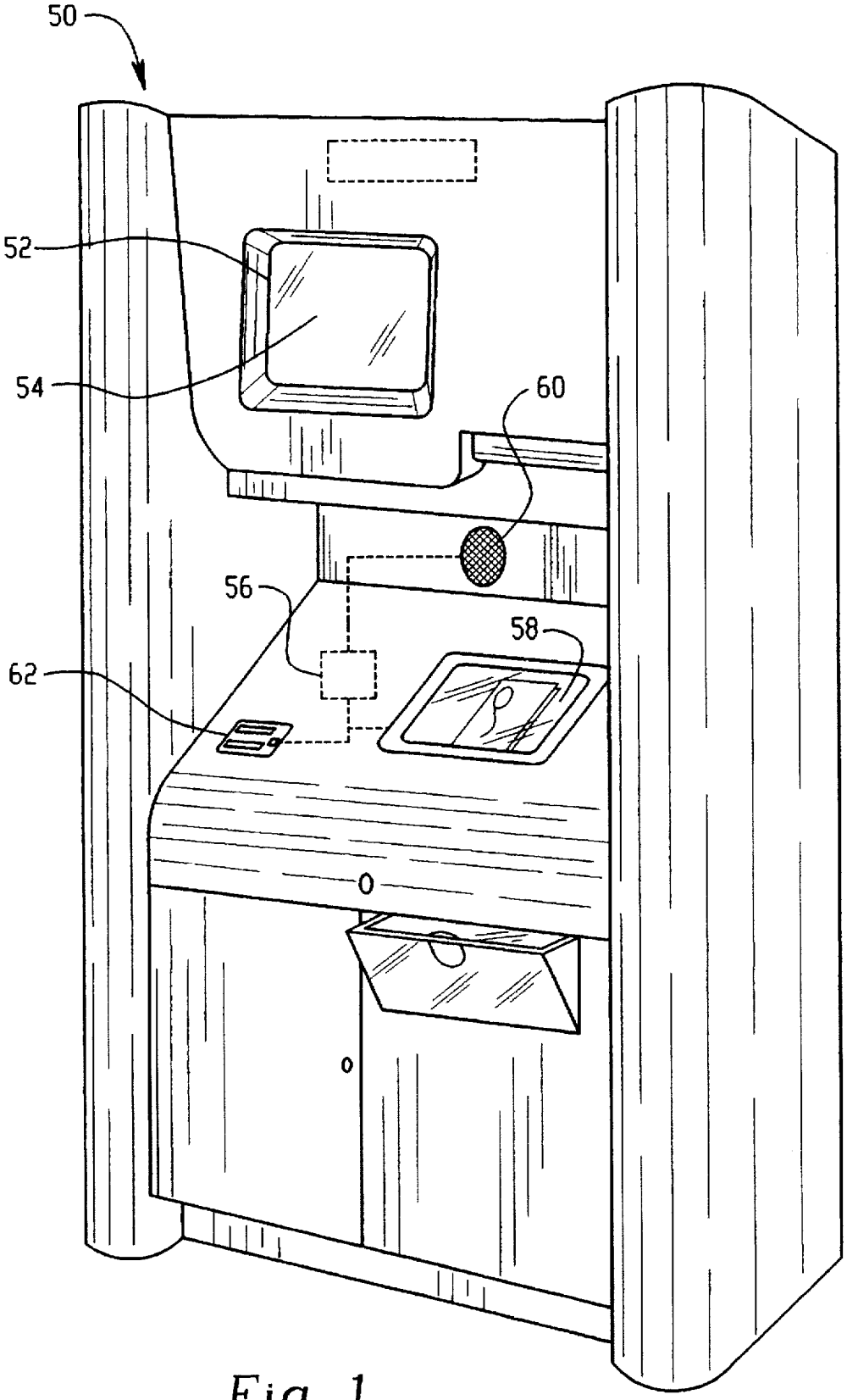
FIG. 1 is an external view of the vending machine according to the present invention.

Referring now to the drawings, and in particular FIG. 1, there is shown an embodiment of the present invention including a terminal area 50 in the form of a kiosk having a monitor 52 with a touch screen 54, a computer 56, printer 58, audio component 60, and a payment receiving device such as coin or credit card slot device 62. Generally, through use of the touch screen 54 displaying a series of screens with card selection and customization criteria, a customer selectively limits the large number of cards stored in memory to only a small group of cards conforming to the selection criteria. The cards of the selected group are displayed on monitor 52 and a specific card format is selected using touch screen. The customer may then use touch screen 54 to add messages to customize the selected card format. If satisfied with the selected customized card, the a customer may choose the card for purchase, which is then printed upon a blank card stock by printer 58. Audio component 60 aids the customer by offering help and informing the customer when incorrect selection or customization criteria have been entered. Control of the above elements is accomplished by the computer 56 located within the enclosure.

Figure 2:
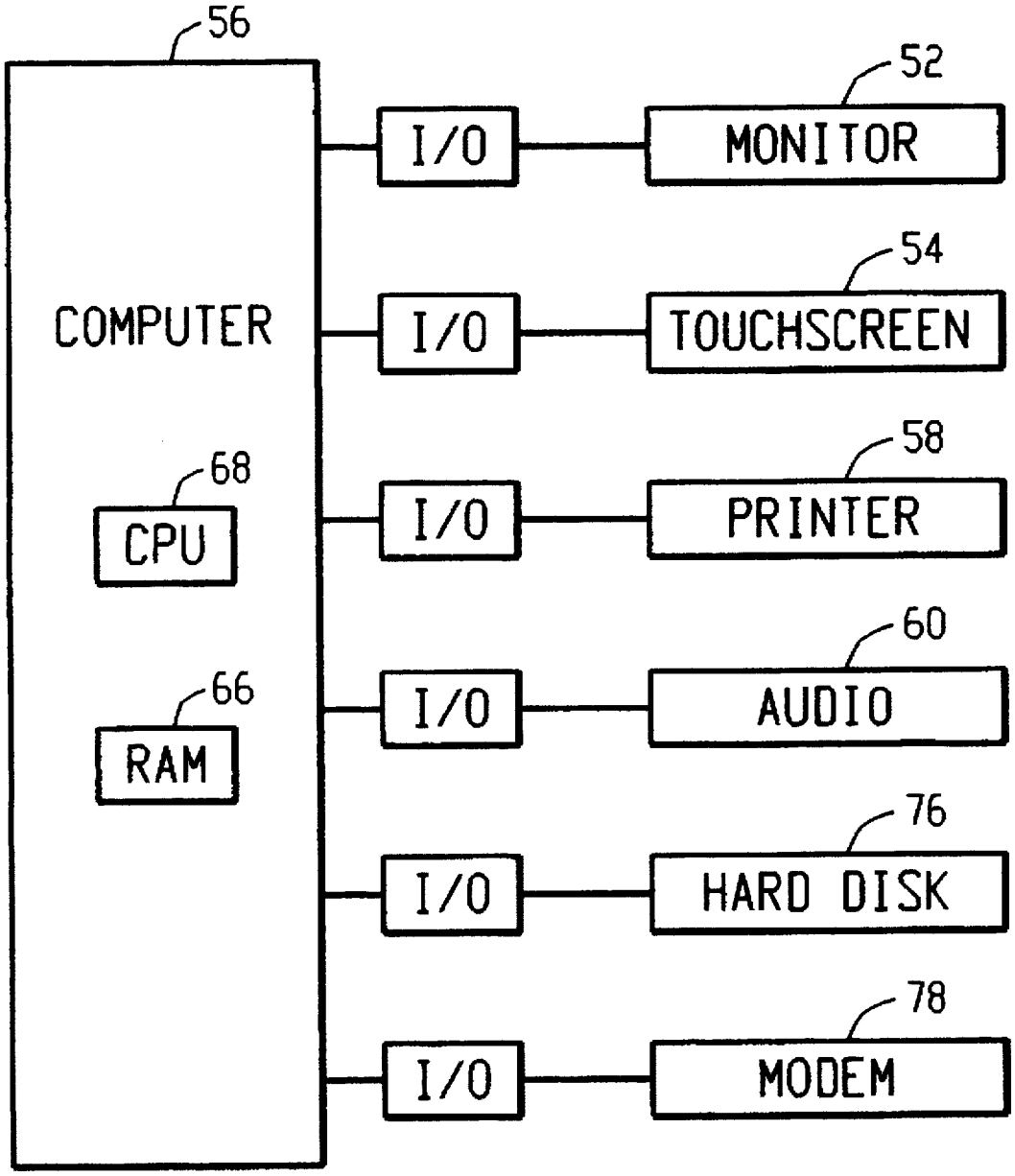
FIG. 2 is a block diagram of a central processing unit of the present invention interfacing with peripheral equipment through input-output interface.

As shown in the FIG. 2 block diagram, computer 56 includes a CPU (central processing unit) 68 and preferably 4 megabytes of RAM (random access memory). The peripheral units include monitor 52, touch screen 54, a printer 58 (including a paper loading device 72 not shown), audio 60 (including an audio controller 74 not shown), a payment receiving device 62, a hard disk 76 and a modem 78, these peripheral units each being coupled to the computer via a suitable I/O interface. The hard disk should have at least 100 megabyte capacity and preferably 200 megabyte capacity.

The computer 56 includes RAM 66 for temporary storage of card characteristics and customization data, and CPU 68 for program execution and peripheral device control. It may further include an internal clock, and preferably operates in the range of 10 to 44 MHz.

As seen in FIG. 2, the computer 56 interacts and controls through suitable input-output interfaces the terminal 50 and touch screen 54, the printer 58, the audio component 60 and audio controller 74, and the payment receiving device 62. The computer may also interact through an input-output device a modem 76. By use of the modem 76, the computer 56 may be telephonically accessed from a central location to enable immediate greeting card addition and update to the stored greeting card formats to include new topics such as current events. It may also allow for inventory (card stock) reordering, periodic maintenance checks, and data gathering operations for statistical data accumulation and accounting purposes.

Monitor 52 is preferably of a "VGA" type that will interface with a conventional touch screen. The touch screen 54 is a transparent pressure sensitive plate capable of signaling to the computer 56 the relative location on the monitor screen contacted by a user. When a "button" display on the touch screen is contacted by a customer, the background of that button may momentarily change color, thereby confirming with the customer that the selection or action indicated by that button has registered with the system. One touch screen which may be utilized with the present invention is available as model E-274 from Electrographics Company of Oak Ridge, Tenn.

A VGA monitor with a 600×480 pixel resolution and 16 colors can store a complete greeting card format in about 70–80 kilobytes using only minimal compression techniques such as eliminating blank spaces and unused borders. For higher resolution screen displays more sophisticated compression techniques are employed such as the JPEG (Joint Photographics Expert Group) algorithm. A screen image for an 800×600 pixel display with 32,000 colors requires 8–900 kilobytes of memory without compression. By increasing the resolution to 1224×1024 pixels the memory requirement for the screen image is increased to 2–3 megabytes. The JPEG algorithm first reduces data redundancy in the image's pixel values using the discrete cosign transform (DCT). Arrays of 8×8 pixel are approximated as regions of color intensity represented by light frequency values. The DCT is applied to the array to concentrate the energy represented in that region into a few coefficients representing the frequencies so the higher frequency coefficients above the visible spectrum can be discarded and the lower frequency coefficients preserved. The DCT coefficients are then quantized to reduce magnitude and to increase zero value coefficients. Thereafter, run-length and Huffman encoding are applied to represent runs of consecutive zero values. The degree of compression achieved by the JPEG algorithm can be varied by reducing the number of DCT coefficients preserved. For greeting card formats of the type involved with the invention, it has been concluded that compression ratios up to 25 to 1 can be utilized for the screen display data without resulting in unacceptable image losses. Thus, the memory required for an 800×600 pixel screen display can be reduced to less than 40 kilobytes and the memory for a 1224×1024 pixed screen display can be reduced to less than 120 kilobytes. Thus, high resolution displays can be used with a modest sized computer according to this invention if the image data is stored in a compressed format. Suitable JPEG compression/decompression systems are available from Optibase Corp., 7800 Deering Ave., Canoga Park, Calif. 91304 or from LEAD Technologies Inc., 8701 Mallard Creek Rd., Charlotte, N.C. 28262.

The printer 58 is preferably a high quality color printer such as an eight pen ink plotter, laser printer or ink jet printer capable of generating text in a predetermined font and a colorized graphic image. The printer 58 may be controlled by a controller which receives instructions and print data from the computer 56. Printer 58 is preferably located behind a transparent plate in terminal area 50 so as to allow viewing of the card while being printed.

An eight pen ink plotter capable of providing high quality print image according to the invention is available from the Hewlett-Packard Co. The data for the print image of the plotter is stored in a compressed vector format which give the starting coordinates for a particular color pen followed by the pen movement instructions. With this data format a complete card format including text and graphics can be stored in 60 kilobytes of memory for a typical greeting card.

High resolution color ink jet printers have been developed by Hewlett-Packard at 300 dpi (dots per inch) and from Cannon in Japan at 360 dpi. A complete bit map storage for these printers would require as much as 1 megabyte of memory storage. The print images are therefore preferably stored in a lossless compressed format. In the range below 10:1 the JPEG algorithm described above is essentially lossless and can be used. For the print image data, inherently lossless compression techniques of the kind developed by PKWARE, Inc. of Glendale, Wis., under the trademark PKZIP®, Version 2.0 are prefered. With the PKZIP® compression technique data compression ratios of up to 10 to 1 may be achieved without any losses. A greeting card print image can be reduced from 1 megabyte of memory to about 100 kilobytes using these compression algorithms.

One advantage of using a laser printer or ink jet printer is that it may be possible to create the screen display and the print image using the same stored image data, thereby eliminating the need for separate screen image and print storage in memory. However, even with the use of laser or ink jet printers, it may still be desirable to store the screen display and print image as separate image data due to distinctions between screen display and print image such as size and aspect ratios as well as other characteristics.

The JPEG algorithm is symmetrical meaning that the decompression operation is essentially the reverse of the compression operation and both take the same amount of time if performed on similar equipment. The algorithm can be performed in hardware or software; hardware implementation usually being faster but more costly. In accordance with the invention compression is usually done on hardware at the plant whereas decompression is done using software in the vending machine at the customer location.

Unlike many printer systems, a plotter does not have fonts developed for its use that can be downloaded to a printer storage. Therefore, all font data associated with the text must be stored in the stored card parameters associated with that card format. The stored data for a card may include the particular stored card format as well as certain font data, including screen and plotter font size data, and screen and plotter font color data. The stored card parameters may also include a font number, which indicates that an output image is to be inverted if the font number is negative. With this stored information, text associated with a stored card format may be printed by a plotter used as printer 58.

A different situation is presented for text which is added in the customization process. As there are no stored font parameters for this text, a separate file is provided with character font data, which font data is handled by a separate instruction routine. The font data file includes data relating to each character that may be printed as well as a predetermined kern value (i.e., the spacing between letters). After the stored card format text has been sent from the hard disk 76 to the printer 58 and printed on a card stock, the CPU 68 accesses the font data file. A character string from the customized message, a specific font, a font size factor, pen color and a positioning x,y coordinate where the customized text is to appear on the card are sent from RAM 66 to the printer 58. Then, using this information and the font data from the font data file, printer 58 prints the customized text on the card stock.

More specifically, the first character from the string is moved into a storage array. Its printed height is determined by multiplying the height data for that character (from the font data file) times the size factor (from RAM 66). The size factor ensures that the customized text is the correct size in relation to the printed stored text. The first character's printed width is determined by multiplying the width data for that character (from the font data file) times the size factor (from RAM 6).

Upon obtaining the dimensions of the printed character, its starting print location on the card stock is next determined. The starting point is determined by first calculating the length of the entire character string. The starting point will then be either 1) the positioning x,y coordinate (for left side justification); 2) the coordinate obtained from subtracting the length of the entire string from the x coordinate of the positioning x,y coordinate (for right side justification); or 3) the coordinate obtained from subtracting one-half the length of the entire string from the x coordinate of the positioning x,y coordinate (for centering the string about the positioning x,y coordinate). In some situations, the text is to be inverted on the card stock, e.g., all text appearing in the upper left and right quadrants will be printed up-side-down, so that the appear normally when the card is folded. In this situation, the starting point is determined in the opposite manner than starting point determination for the non-inverted print.

Once the dimensions and starting point of the first character of a string are determined, the character is printed on the card stock using a determined pen color (from RAM 66). The starting point of the next character is determined by adding to the previous starting point, the width of the previous character and then a spacing equal to the kern value (from the font data file) multiplied by the size factor (from the RAM). After calculating the dimensions of the character, it is then printed. This process continues until the entire character string is printed, at which point, the routine returns control to the main program to either continue or print the next customized string. When the character received in the storage array is an "@", this indicates that the final customized character has been printed and that the card is completed. A signal is therefore sent to by the printer control 70 to eject the printed card from the printer 58.

Card stock is fed into printer 58 by means of a paper loading device 72, which includes a plunger in positional relation to the paper feed activation button on the control panel of the printer. Upon start-up of the vending machine after power has been shut down, or at some point after a printed card has been ejected from the printer, the plunger is brought into contact with the paper feed activation button to thereby cause a new sheet of card stock to be fed onto the printing bed of printer 58. Upon initial start-up of the printer there is a short interval in which the paper feed activation button is inactive while the printer is warming up. The plunger is provided so as to delay contacting the paper feed activation button until after the warm up period. A similar time delay could be achieved using a logic circuit used to activate the control switch for the printer.

The terminal unit 50 may also include at least one audio component 60 coupled to an audio controller 74 to control volume level and tone from the audio component. Voice recordings are digitized and stored on hard disk 76. At select intervals, a particular voice message is loaded and played back over audio component 60 by the CPU 68. The voice messages may be for the purpose of marketing and advertising, to provide help to a customer during use of the vending machine, or to inform a customer when an error in the input of card characteristics or customization information has occurred. As will be explained hereinafter in greater detail, during loading and playback of a voice message, the CPU 68 periodically checks for a touch of one of the "buttons" on the touch screen 54. If a contact is detected, an interrupt signal is generated and the loading or playback of a voice message is terminated.

A payment receiving device 62 for accepting revenue through a bill and/or coin receiving mechanism a credit card reader.

Stored on the hard disk 76 is the data for the graphical representation of the menu or query screens displayed on the monitor, as well as parameters associated with each screen. Such parameters may include the following:

- a screen number, which uniquely identifies each screen
- a prior screen number, which identifies which screen to backup to when requested
- a "more screen" number, which identifies the screen number containing additional responses to the same question posed on the present screen, but which were too numerous to fit on the present screen
- button variables, which are properties or characteristics that may be assigned to a particular "button" or location on the screen (there may be up to 60 on a single screen)
- button number, which is the number of each button for touch screen location
- action code, which defines the next action for a particular button
- next screen number, which identifies the next screen number for activation of a particular button
- upper left x,y screen coordinates
- lower right x,y screen coordinates.

As will be explained hereinafter in greater detail, the next screen presentation depends upon a given response; that is, only those next screens which are appropriate to a given response will be presented to a customer, thereby avoiding presentation of unnecessary and irrelevant questions.

THE SELECTION AND CUSTOMIZATION PROCESS

Figure 3:
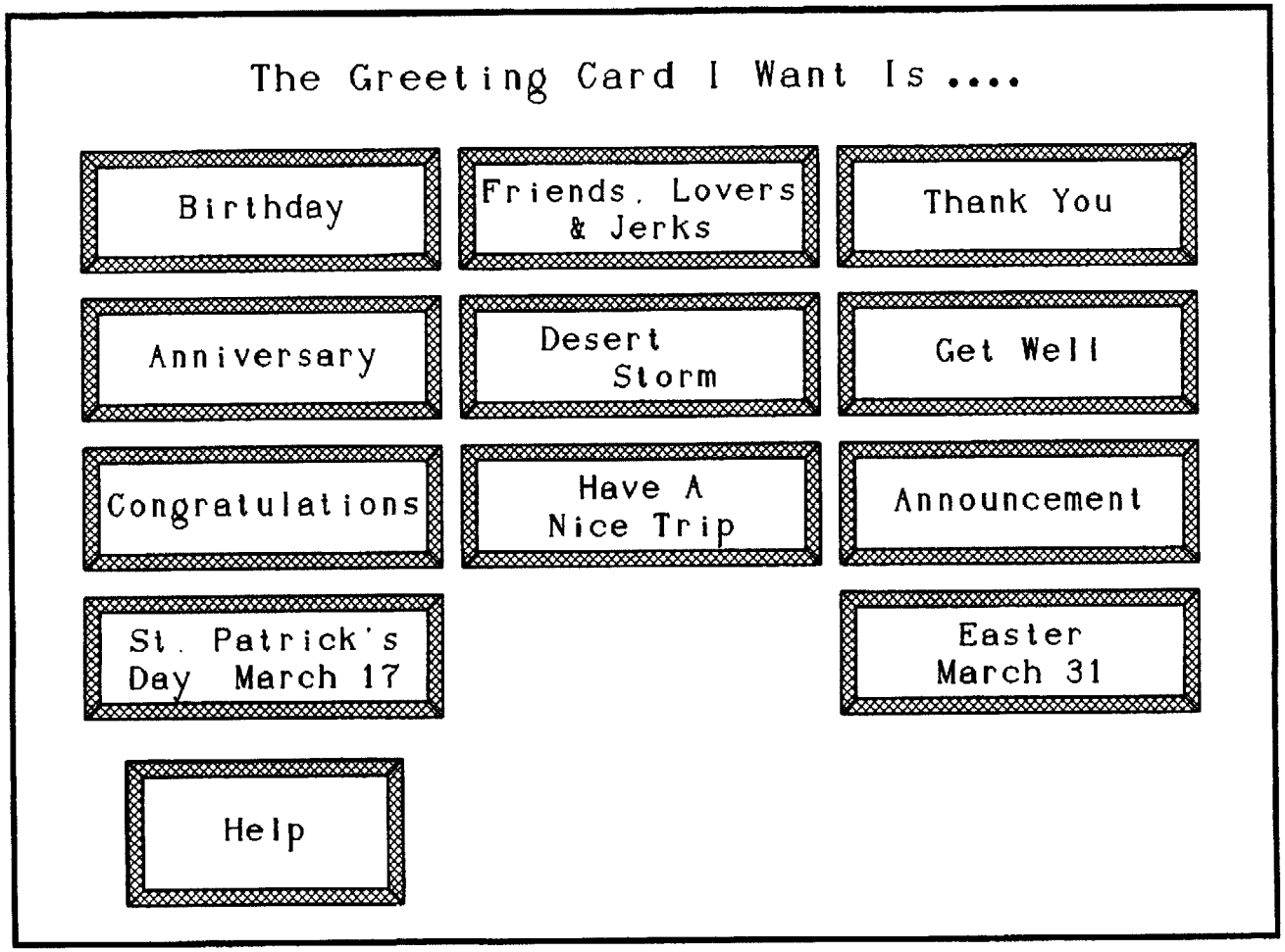
FIGS. 3–8 show screen displays of the characteristic selection level according to the present invention.

In the present invention, a customer may use the touch screen 54 to select criteria for the desired card. The selection criteria may be elicited from the customer's response to a series of questions, which can be categorized as first level selections, second level selections, etc. First level selections are used to select a "general application" related to the occasion for which the card is being sent. For example, as seen in FIG. 3, the statement, "The greeting card I want is . . . " may be displayed on the monitor followed by a list of possible choices, such as, birthday, anniversary, etc. The responses are set forth in visible touch zones or "buttons". A response is designated by touching the button on the touch screen containing the desired response.

Once the general application has been selected, the next screen may present a second level selection, broadly referred to as "specific use criteria", followed by a list of possible responses. The second level selections may be particularized to the responses to the first level selections, thus ensuring that only necessary and appropriate questions are presented to the customer for response. For example, if a birthday card is indicated in the first level selection, the relationship to the recipient is useful for the card selection whereas, if a Mothers's Day card is indicated in the first level selection, the relationship of the recipient is known and need not be determined on the second level.

Examples of statements eliciting responses to second level selections may include the following:

The person receiving the card is my . . .

The style of card I want is . . .

The card is being sent by a . . .

The card is being sent to a . . .

Figure 4:
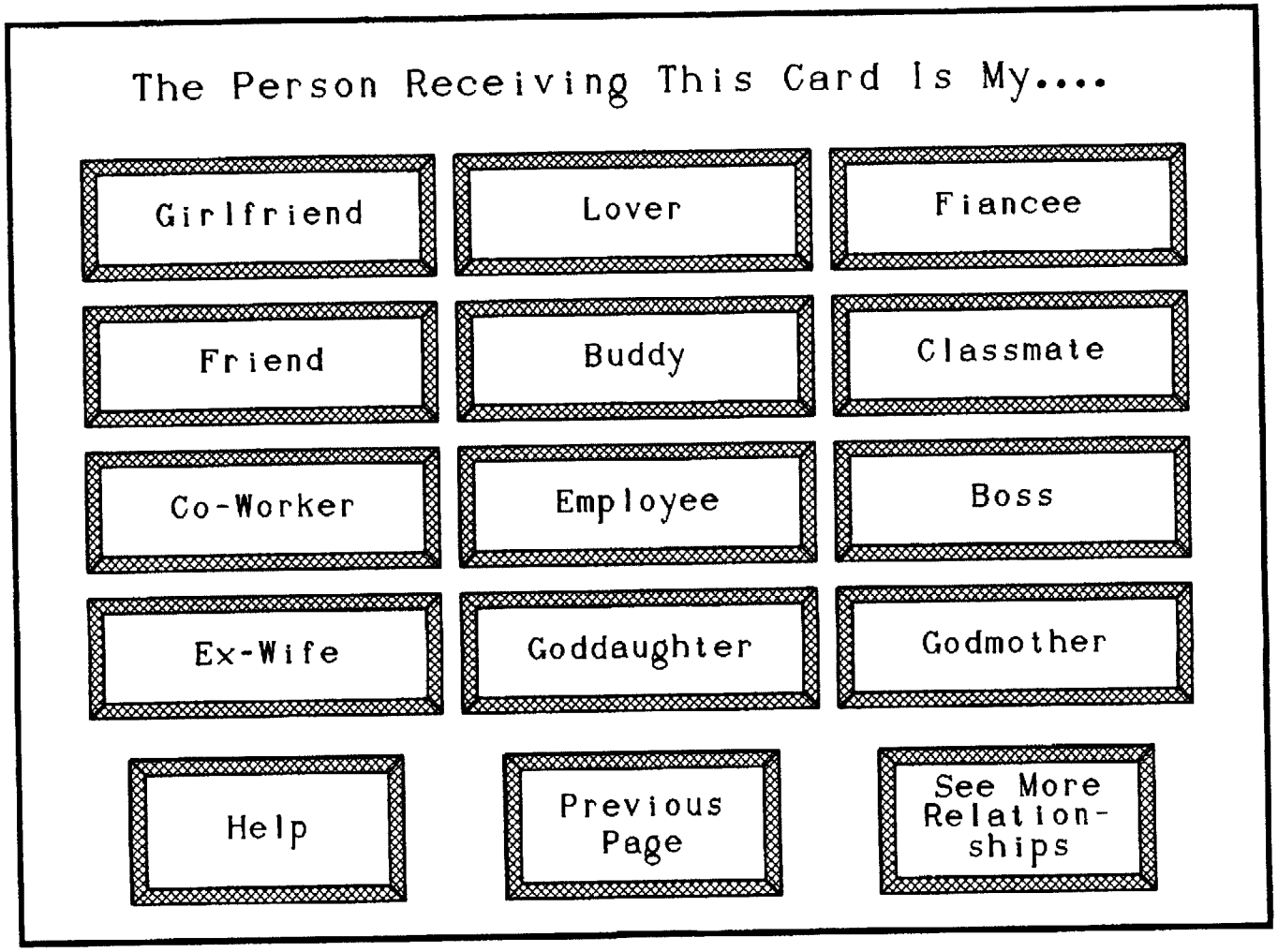
Figure 5:
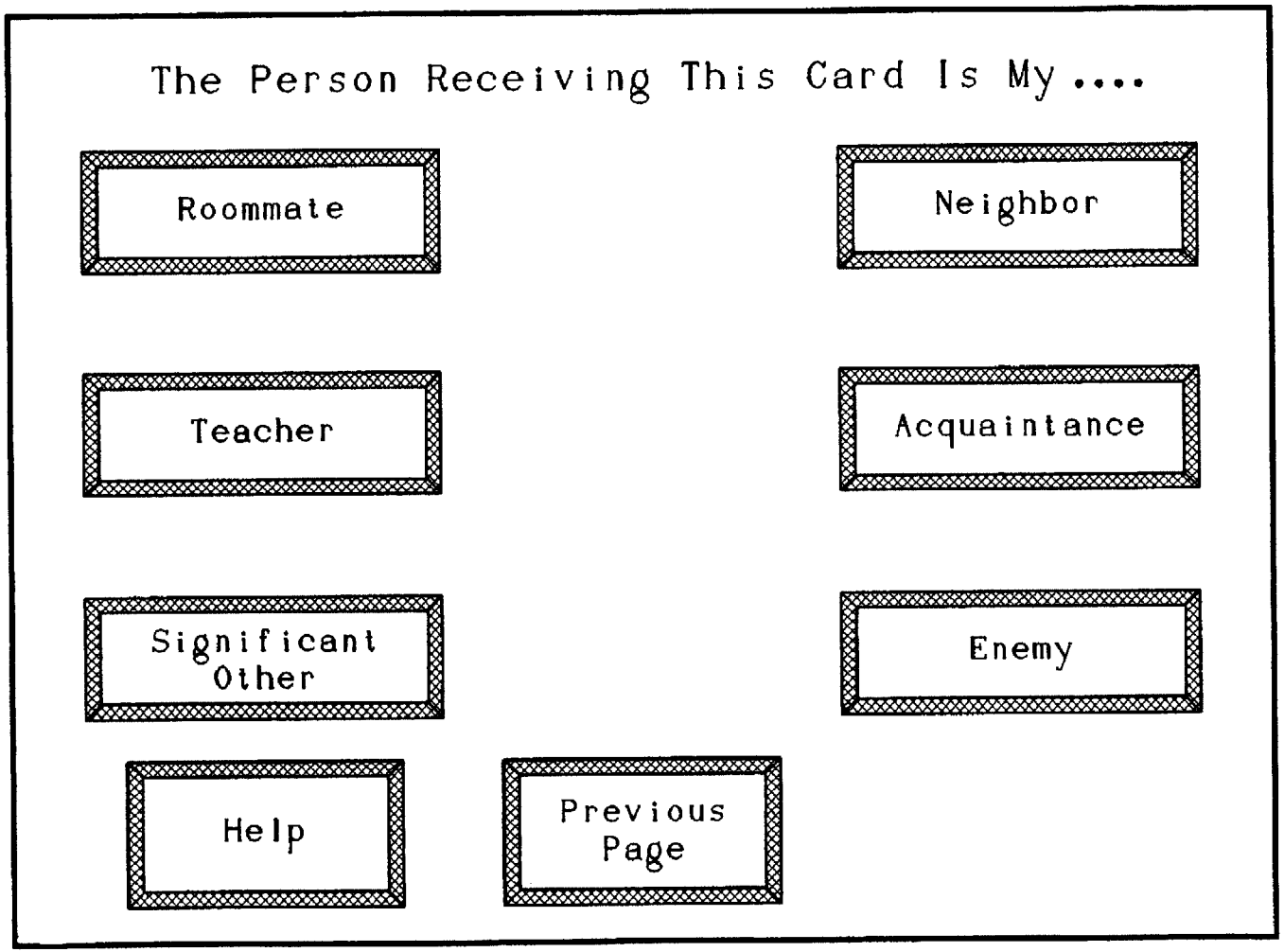

FIGS. 4–8 illustrate these statements displayed on the monitor, together with a list of possible responses. As with the first level selections, a response is designated by touching the "button" on the screen containing the desired response. As seen in FIGS. 4 and 5, the possible responses to some questions are too numerous to fit on one screen without making it unreasonably confusing or difficult to choose a desired response. For these questions, a customer is given the option to display additional screens containing further possible responses.

A question on a given selection level may lead to a presentation of additional screens (not shown) with further sublevel questions. These sublevel selections are use to further describe or clarify a response. For example, if, in response to the statement, "The person receiving this card is my . . . ", as shown in FIG. 5, and the customer chooses "roommate", an appropriate sublevel inquiry may be presented asking whether the person is male or female.

As seen in FIGS. 3–8, each screen display may also present a "button" allowing a customer to seek help, or return to a previously asked question to modify a previous response.

Figure 9:
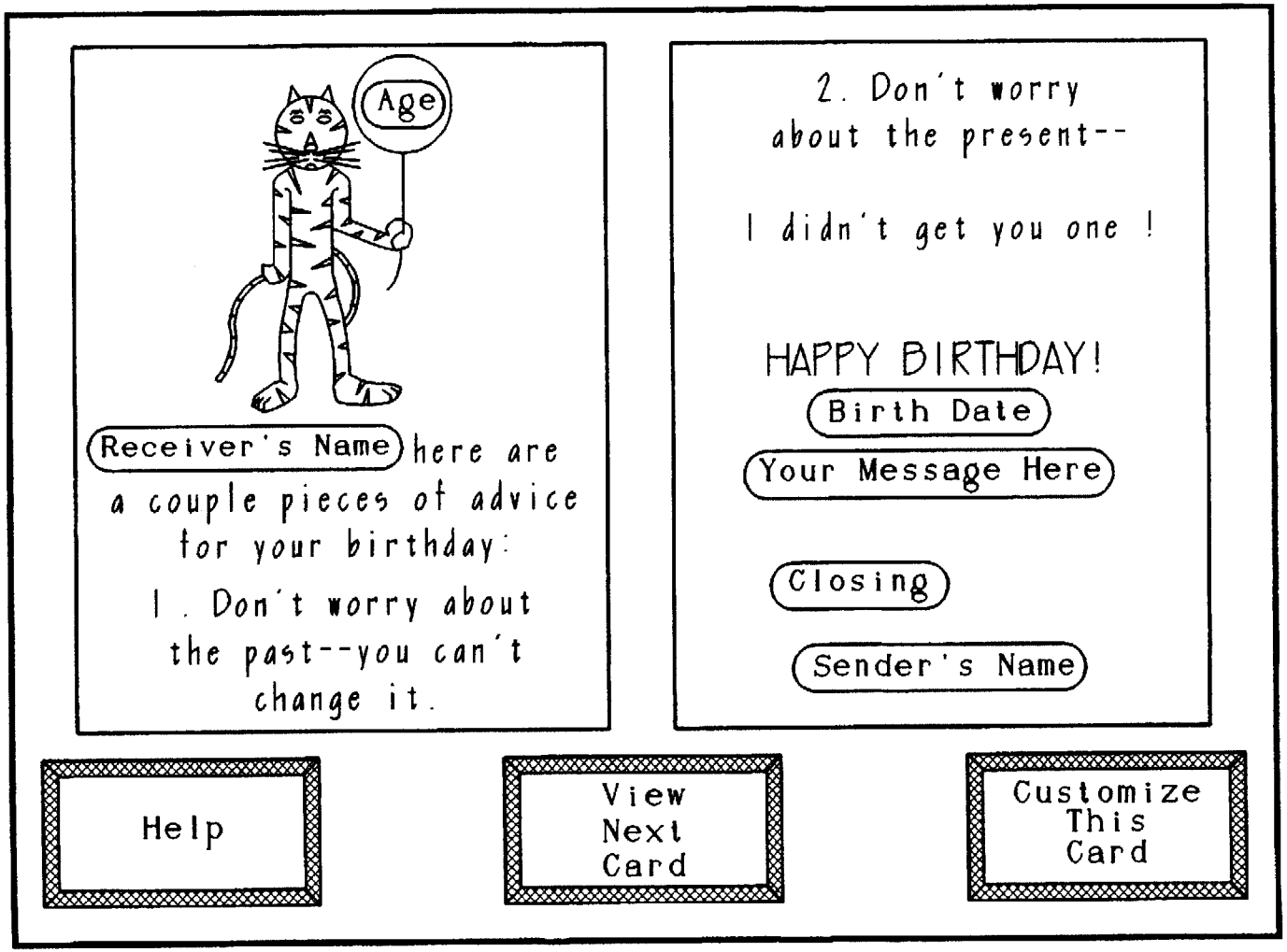
FIG. 9 shows a display of a card format on the monitor prior to customization.

As the card selection criteria are designated, the criteria are stored and used by the computer to select from among the card formats stored in memory those cards conforming to the set of criteria selected by the customer. The card formats are stored on the hard disk together with associated card criteria, including a general application category code as well as codes for the specified card criteria. A sort routine is executed by the computer to sort through the stored card data by comparing the stored criteria codes with the code representative of the customer-selected card criteria to find all matching card formats. If a match is found, the card format is selected for display on monitor 52. This group of cards is presented one at a time as can be seen in FIG. 9 for selection by the customer using the touch screen.

Upon selection of a specific card format the monitor 52 displays questions requesting customization information for the card. These questions may be considered the next level of selection where the customer may be asked:

What is the name of the person or persons receiving the card?

What is the name of the person or persons sending the card?

Where is the card being sent to?

Where is the card being sent from?

What is the date?

What is the personalized message you wish to include in the card?

The questions presented may vary depending on the responses to the first and second level selections (i.e., if a birthday card is selected as a first level selection, a customer may be asked to provide a recipient's age when customizing the card). Additionally, as in the first and second level selections, there may be sublevel selections presented for a given response while customizing the card.

Figure 10:
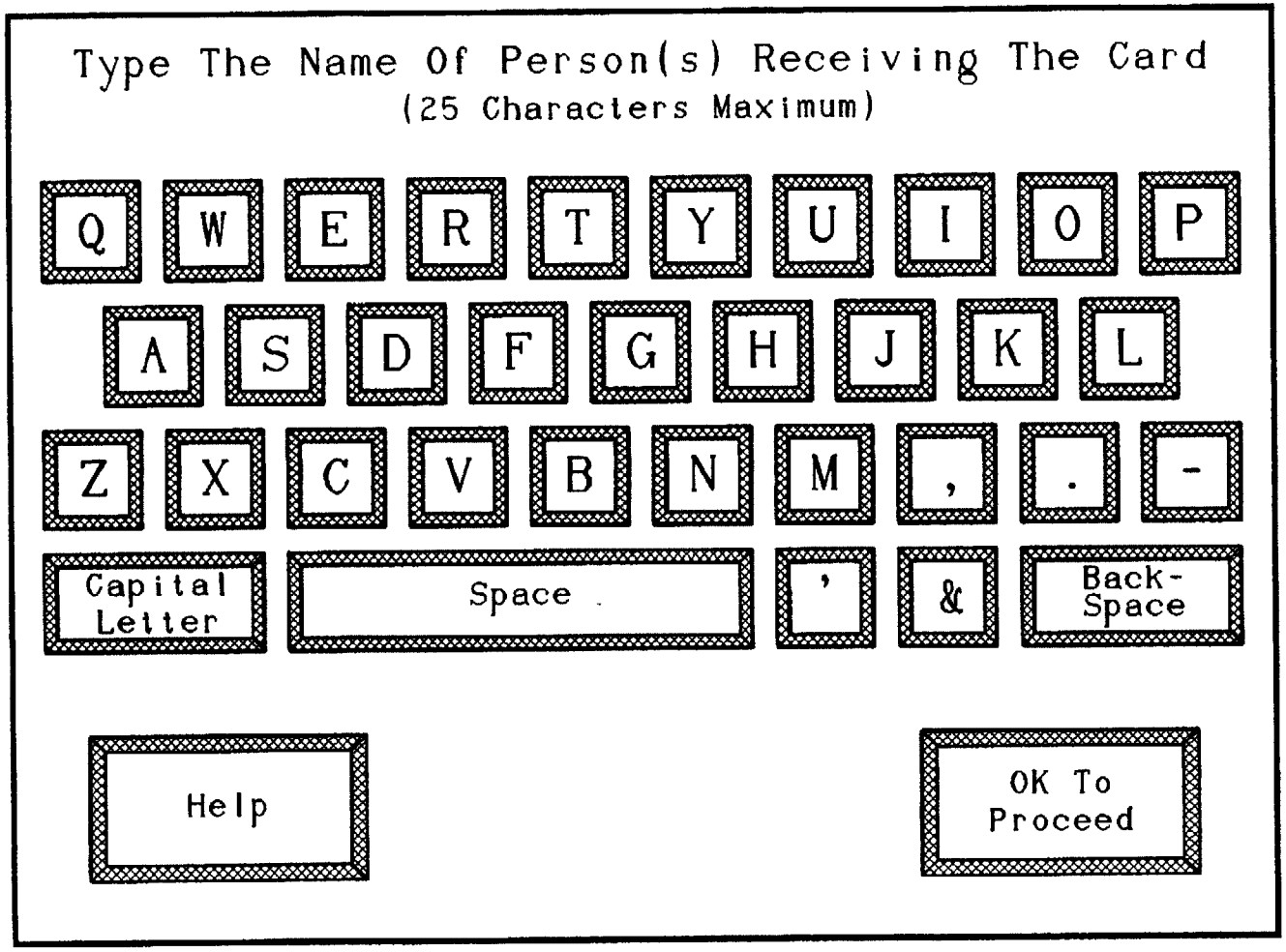
FIG. 10 shows a screen display of the customization level according to the present invention.

Many of the responses to customizing selections require a customer to type in a message. To accomplish this, monitor 52 may display letters as they appear on a typical typewriter key board, as seen in FIG. 10. For example, in entering the name of a person to receive the card, a customer touches the letters on touch screen 54 that spell out the recipients name. As physical space for messages being inserted in the card is limited, the display may indicate a limitation on the number of letters as shown in FIG. 10. For example, a recipient's name may be no more than 25 characters, a sender's name may be no more than 15 characters and the message on the card may be no more than 80 characters. As with the previous selection levels, help screens may be available, as well as an option to change a response to the present or previous questions.

Figure 11:
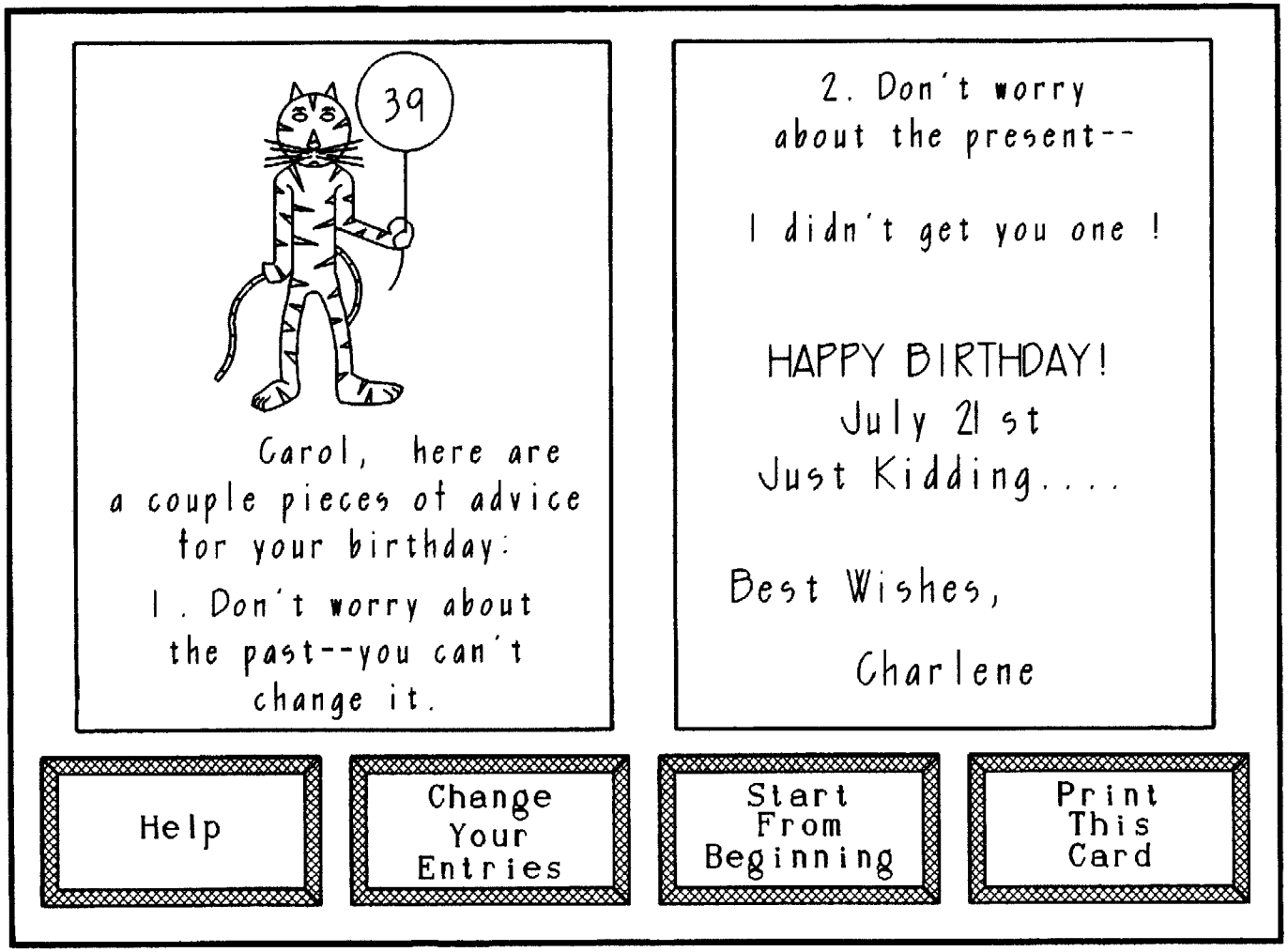
FIG. 11 shows a display of a card format after customization.

Once the customization information has been entered, the final version of the card is displayed on the monitor as shown in FIG. 11. At this point, the customer is given the option to print the card (and pay for the card), to change an entry or to start from the beginning. Up until this point, the customer has not been required to tender any fee for the preparation of the card. Only if the customer is satisfied with the selected customized card composed on the screen and wishes the card printed by the printer will a fee be required. Thus, a customer may repeat the process of creating cards on the monitor as often as desired and no payment is required. Payment is required only upon printing of the card onto the card stock.

The same stored display card format is used for the FIG. 9 display (before customizing) and the FIG. 11 display (after customizing). The stored card formats include the graphics and the fixed text. The insert legends "age", "receivers name", "Birth Date", "Your Message Here", "Closing" and "Sender's Name" appearing in FIG. 9 are added to the basic card format as overlays, preferably in a distinctive color. FIG. 11 is formed using the same card format from memory with the customized insert created as an overlay. The same process is used in printing the card where the card format is first created from memory and the customized inserts are then added as an overlay.

System Operation

As shown by FIGS. 12–23, system operation may begin by presenting a recurring display of graphic images for the purpose of advertising (steps 101 through 106, to attract the attention of customers passing by the unit. After each marketing graphic file is loaded from the hard disk 76 into RAM 66 and displayed on monitor 52 (step 255), the program, at step 103, checks for the existence of a sound file that may correspond to the current graphic image. This process of matching graphic displays with associated sound file may occur every time that an image is displayed. If an appropriate sound file exists, it is then read from the hard disk into memory and "played" through the audio component 60, attached with a special adapter to a parallel port of computer 56 (step 112). As explained hereinafter in great detail, during the process of loading and playing the sound file, a touch on the monitor screen can interrupt the process at any point.

Figure 13A:
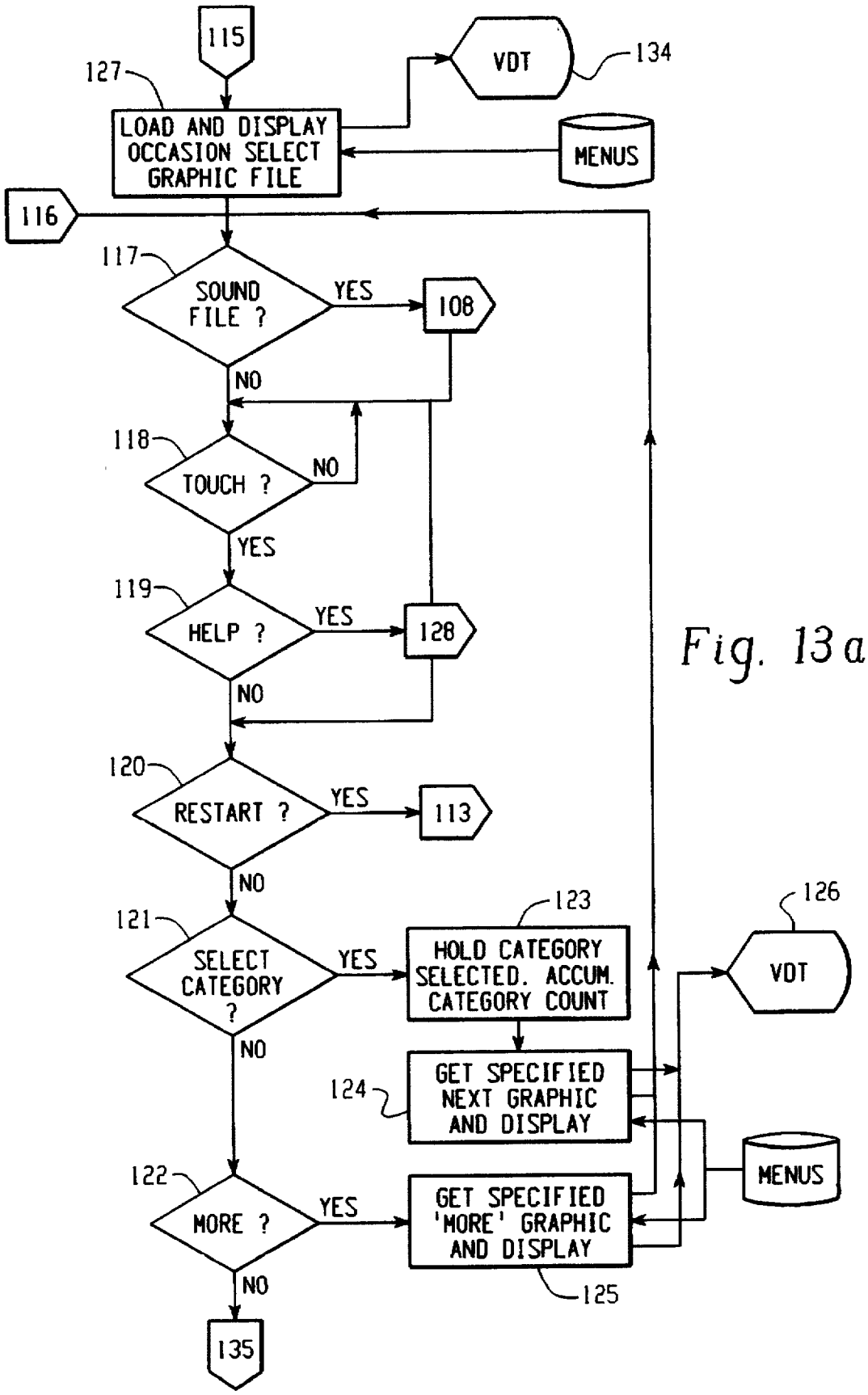
Figure 13B:
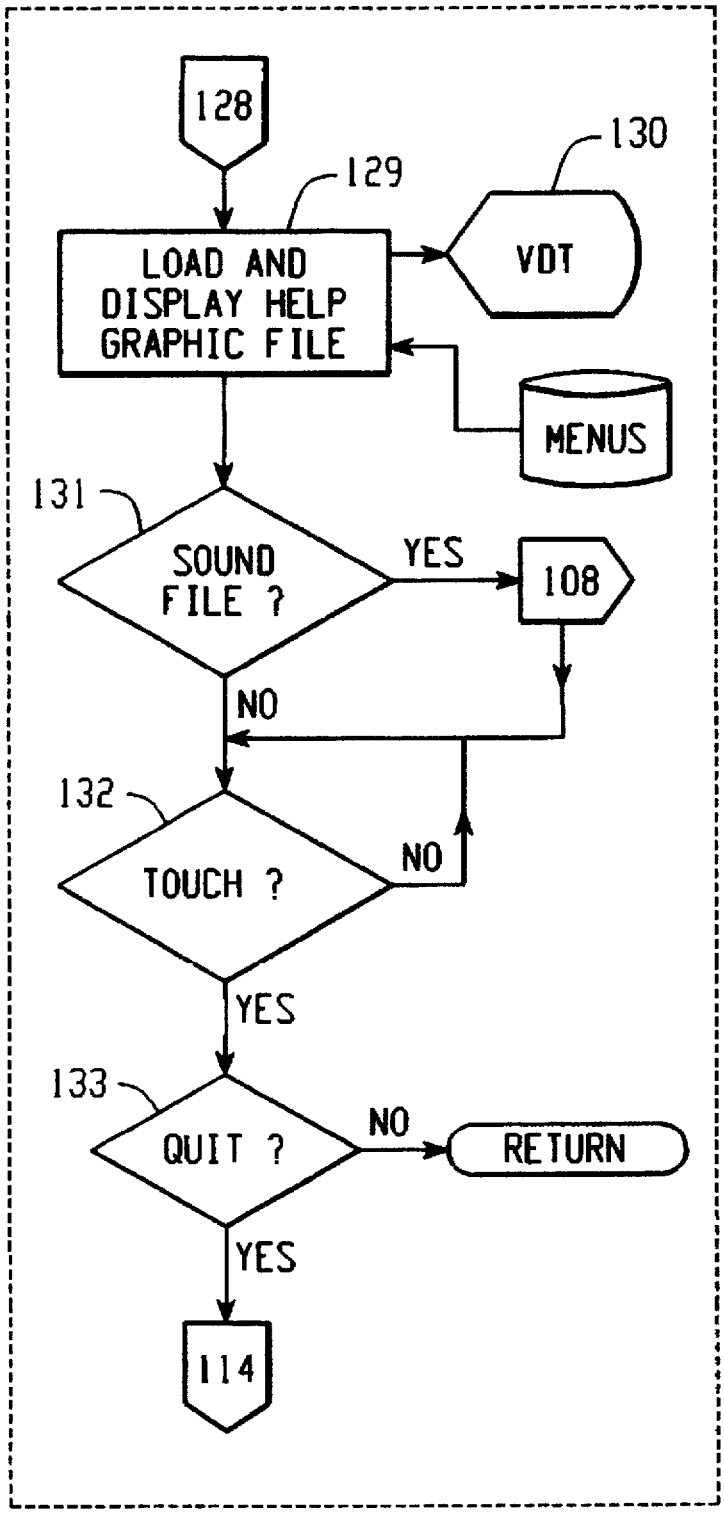

The characteristic selection process begins at step 115 (FIG. 13). The first level selection may present as a display on monitor 52 one or more graphic images that offer a choice of defined applications or occasions (see FIG. 3). With the exception of the recurring marketing display, there is a timeout built into the touch routine. That is, if there is no touch detected within a preset interval, the program automatically returns to the cycling marketing screens (steps 101 to 106). From the occasion selection screen, as well as all other selection screens, several actions are possible.

Program step 119 defines processing of a help display in response to contacting the help "button" as seen on FIGS. 3–8. A particular help graphic display is defined in the screen number element of the help button definition. When a return button on a help screen is touched, the program redisplays the screen that was on the monitor 52 just prior to requesting the help screen. As shown in step 120 (FIG. 13), a customer can restart the process from any screen. This action will return to re-entry point 113 in FIG. 12.

If the screen presents a choice of applications or categories, as shown starting in step 121 of FIG. 13, a category choice selected by the customer is saved in memory and a category counter is incremented. The specific category choice is contained in the action code element of the button definition and the next screen for display is identified from the next screen number. A screen may present the option to see additional responses to a given question which are not displayed on the present screen (e.g., the "See More Relationships" button on FIG. 4). Program step 122 defines a new selection screen at the same level, for example, FIG. 5 presenting additional responses. That is, the screens of FIGS. 4 and 5 each relate to selection of the relationship of the recipient of a greeting card to the sender.

Figure 14A:
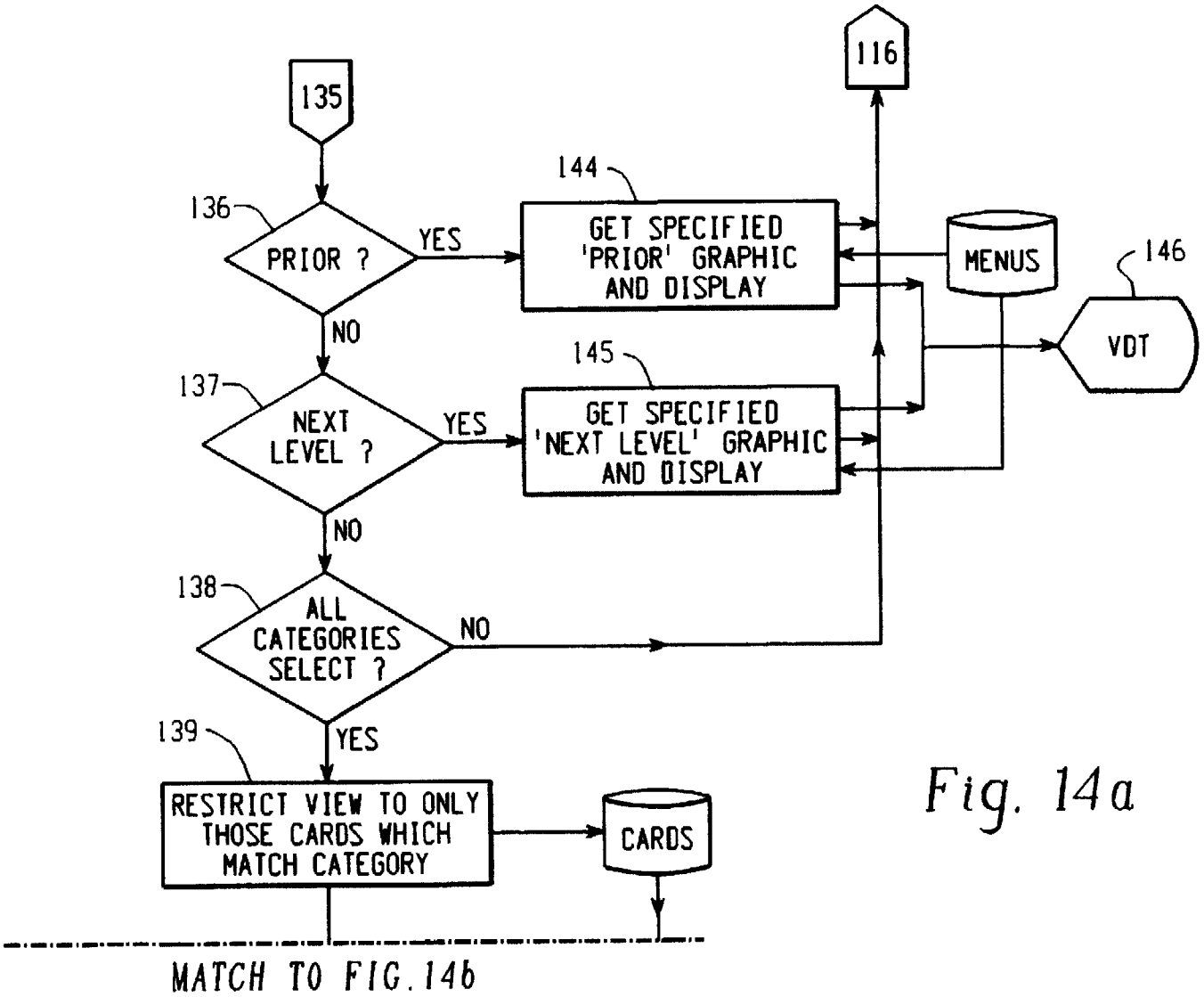
Figure 14B:
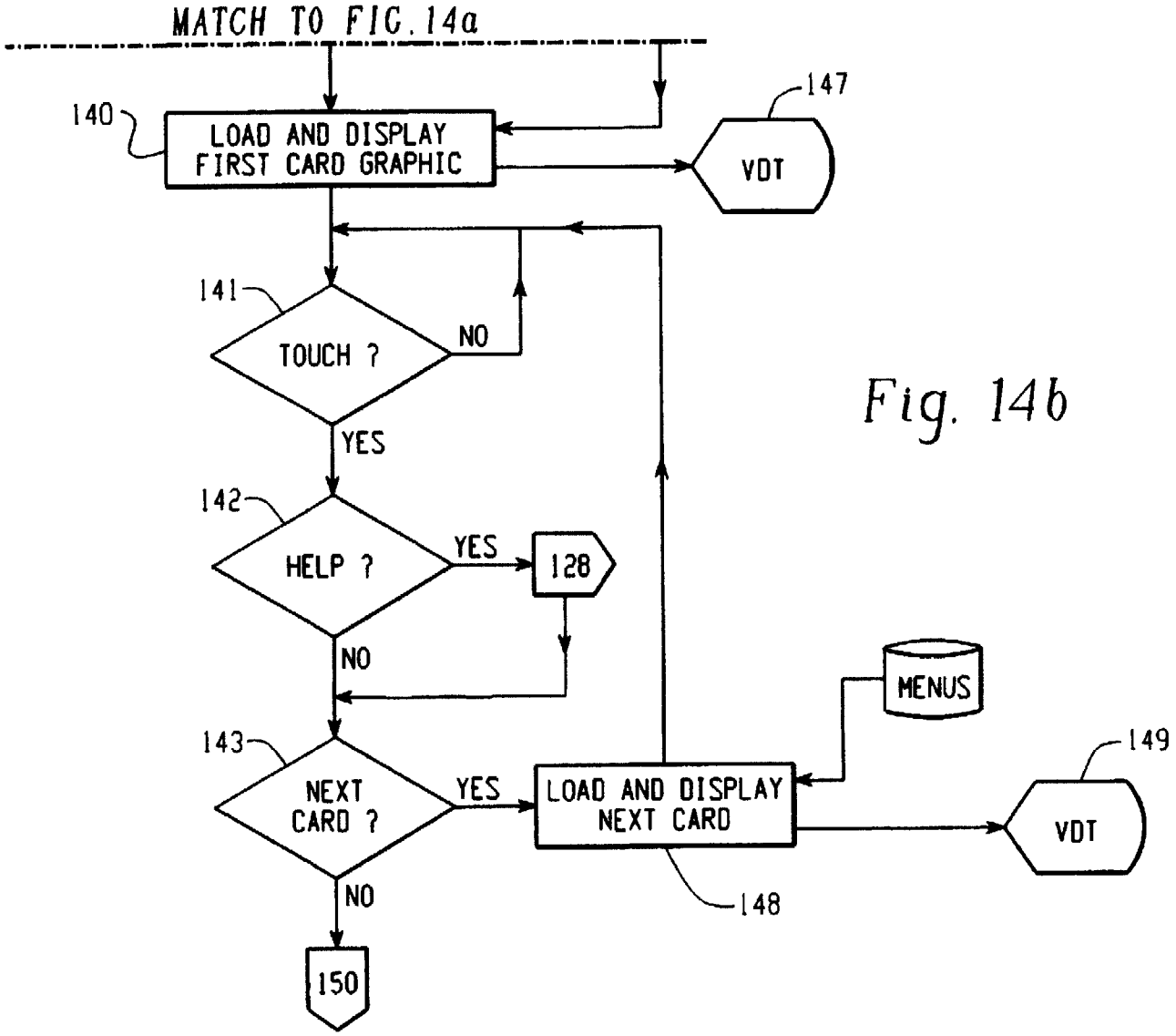

To reverse the menu flow, as traversed up to this point, the prior action may be taken from step 136 in FIG. 14. The screen defined in the prior screen number element of the current menu definition is then displayed. Any selections made on screen appearing after the presently displayed screen are blanked and the counter decremented.

Figure 6:
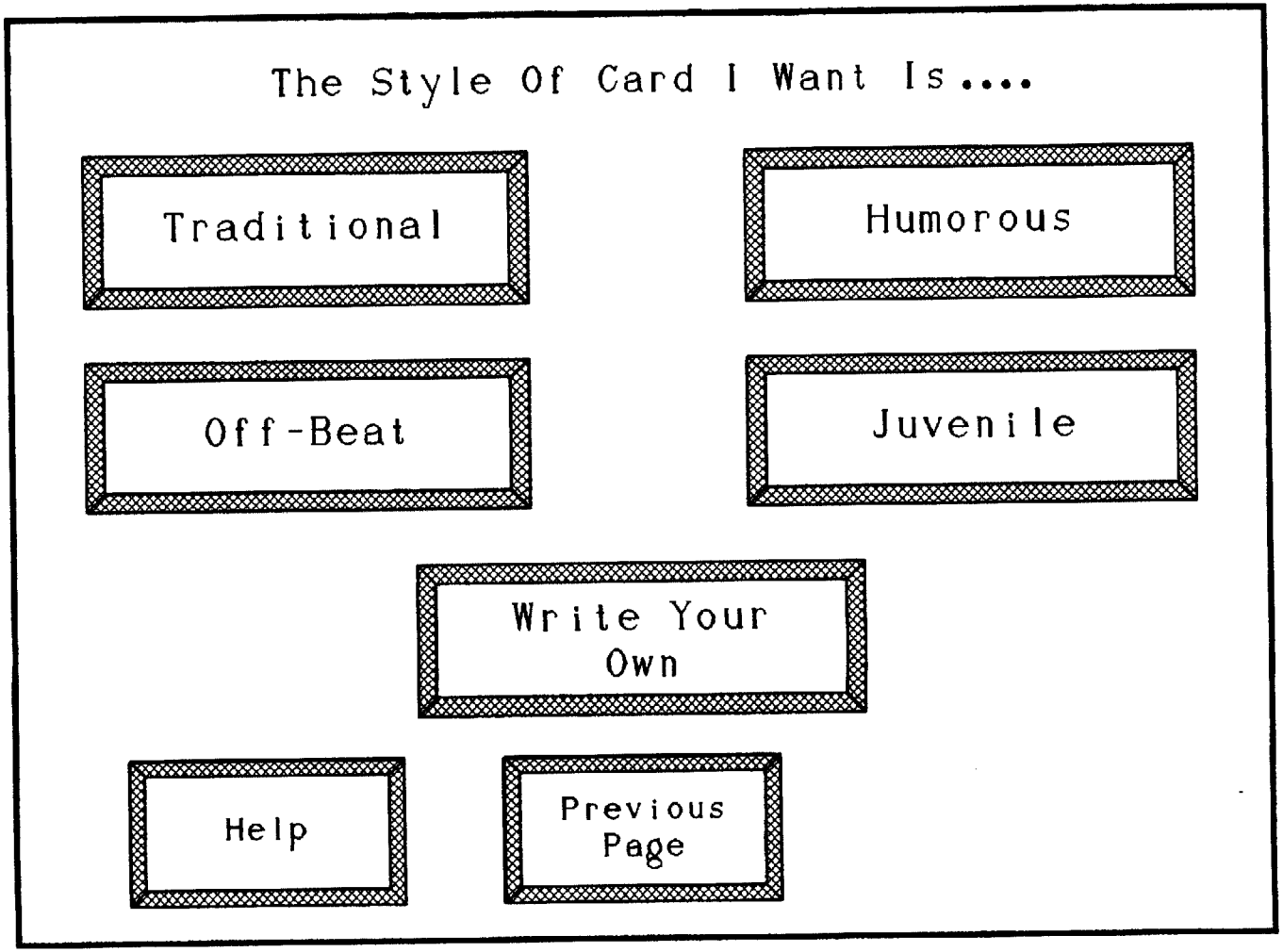
Figure 7:
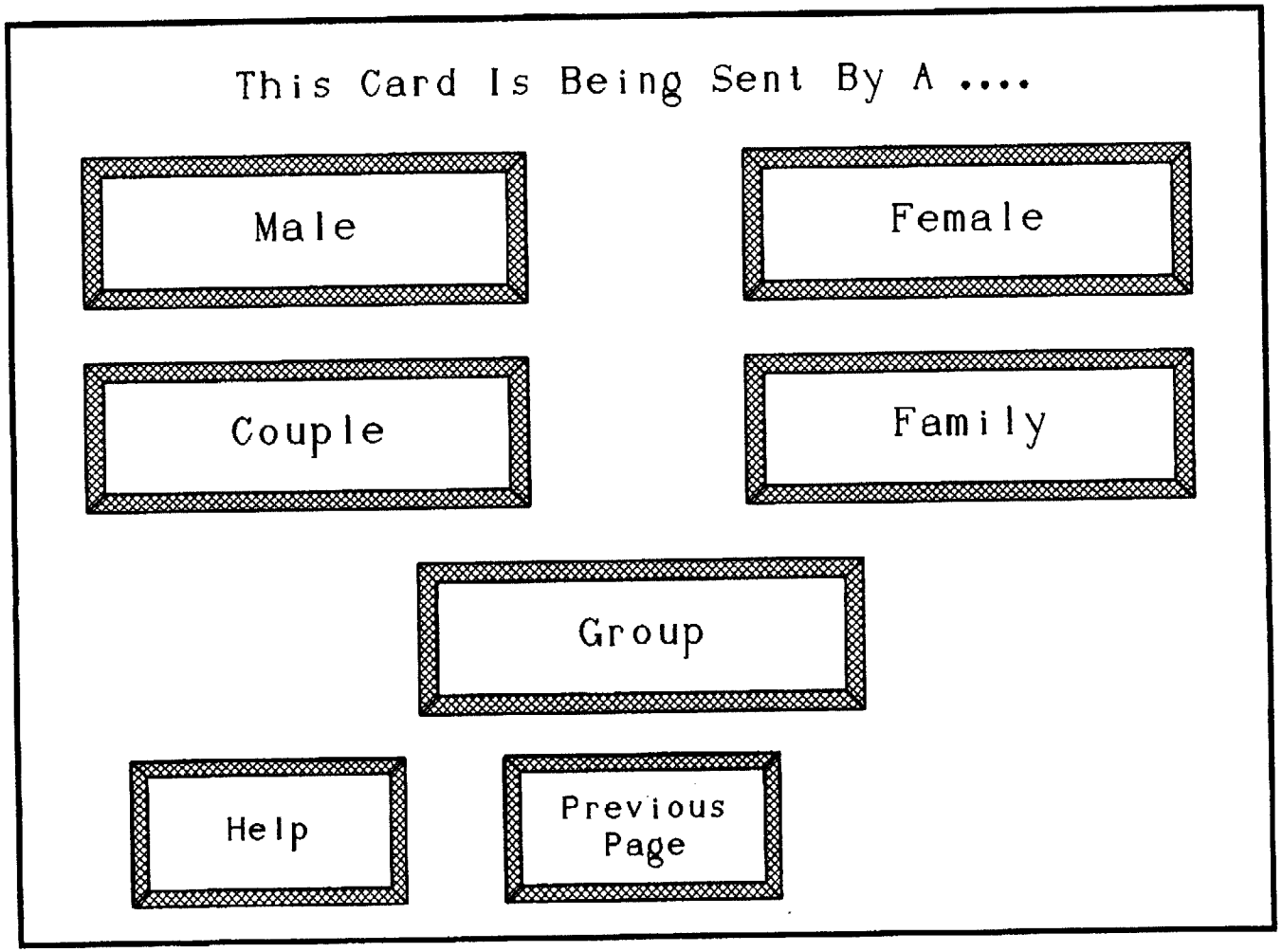
Figure 8:
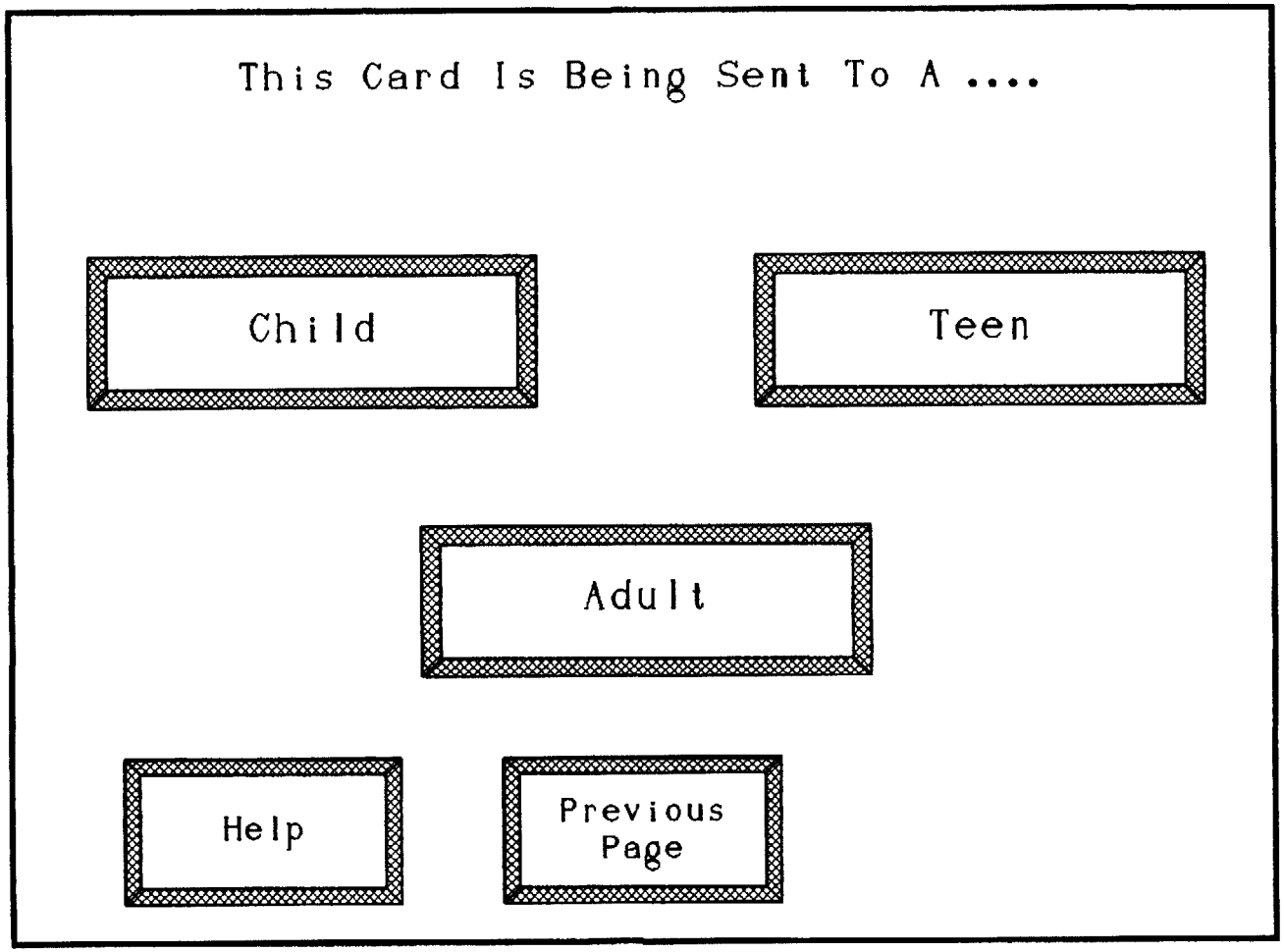

Once all relevant selections at a given level have been made, the next level is presented at program step 137 (FIG. 14). FIGS. 6–8 illustrate questions which may be asked in response to questions on the previous level (FIGS. 4–5). The process of making selections at specific levels may be repeated until all level screens defined for the selected card application have been exhausted.

Once all selections for a desired card have been entered, only those cards from the stored card formats that conform to the selections made at each level will be chosen for display in the next level. The first viewable card is then displayed on the monitor 52 as, for example, in FIG. 9. The help option is also available at this point, in step 142. The customer may request the next card to be displayed, or select the card that is being viewed for customization. As shown in FIG. 9, certain customization information may be entered at this point in the card design format, such as the receiver's name, birth date, a short message, a closing, and the sender's name.

Figure 15A:
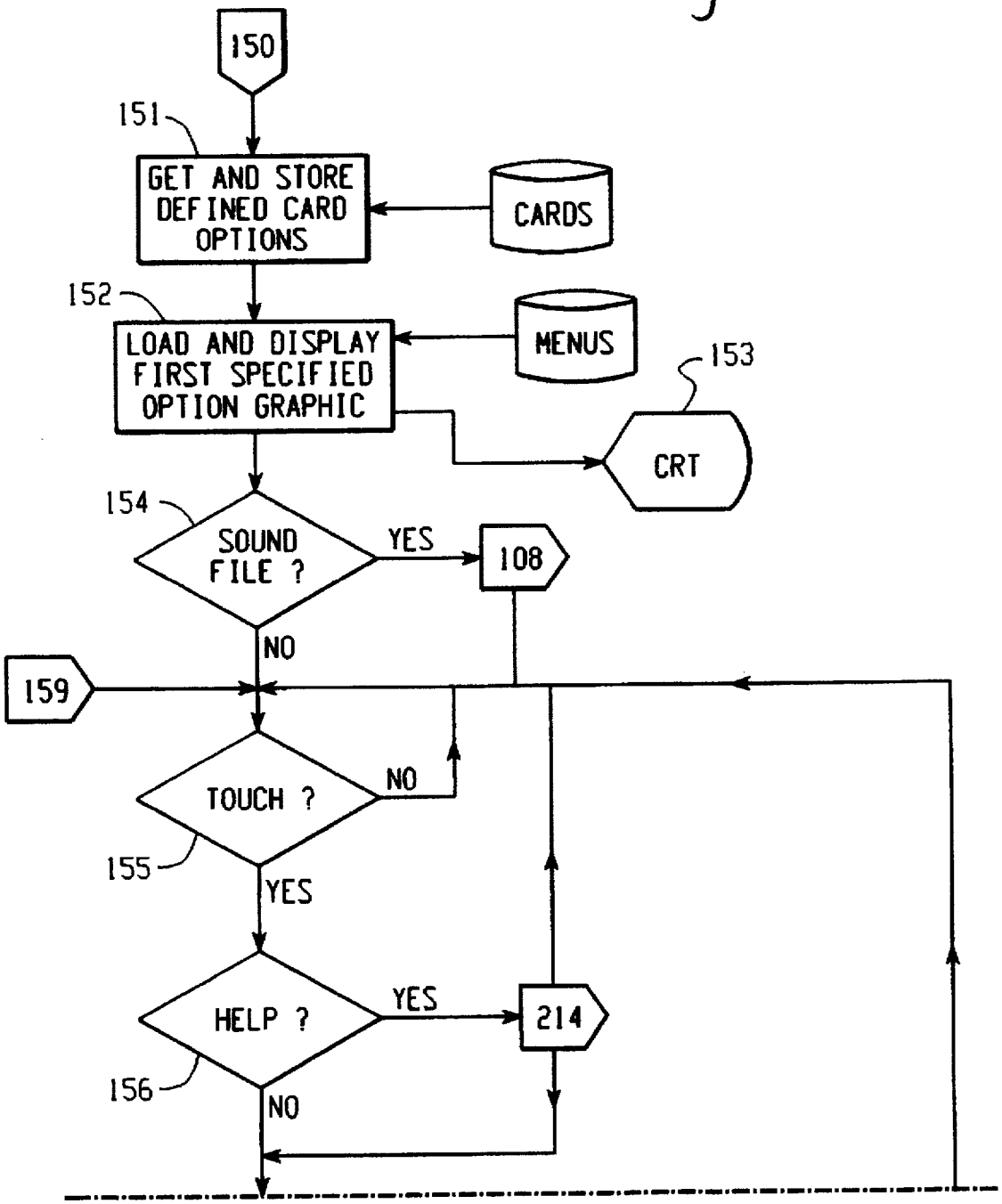
Figure 15B:
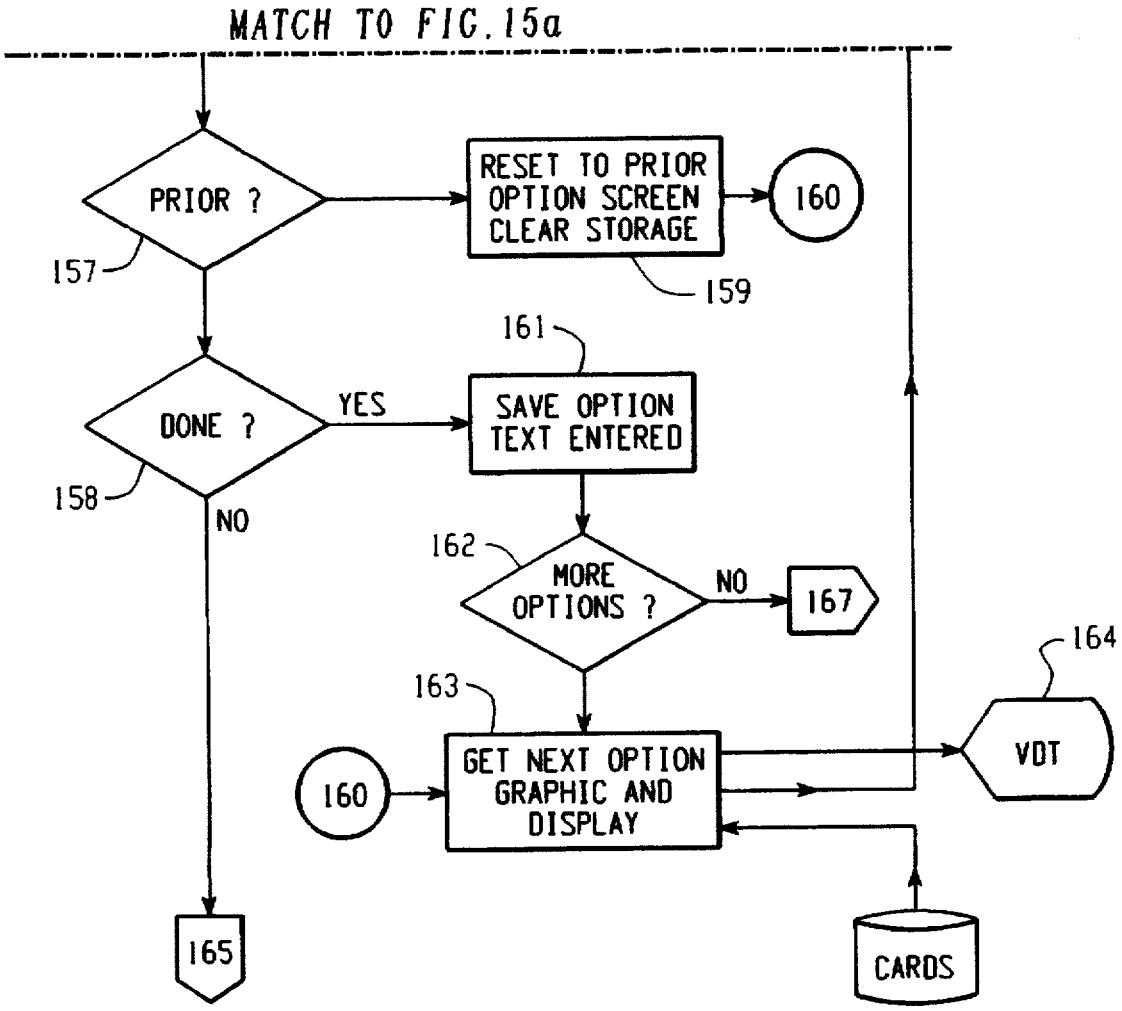
Figure 16:
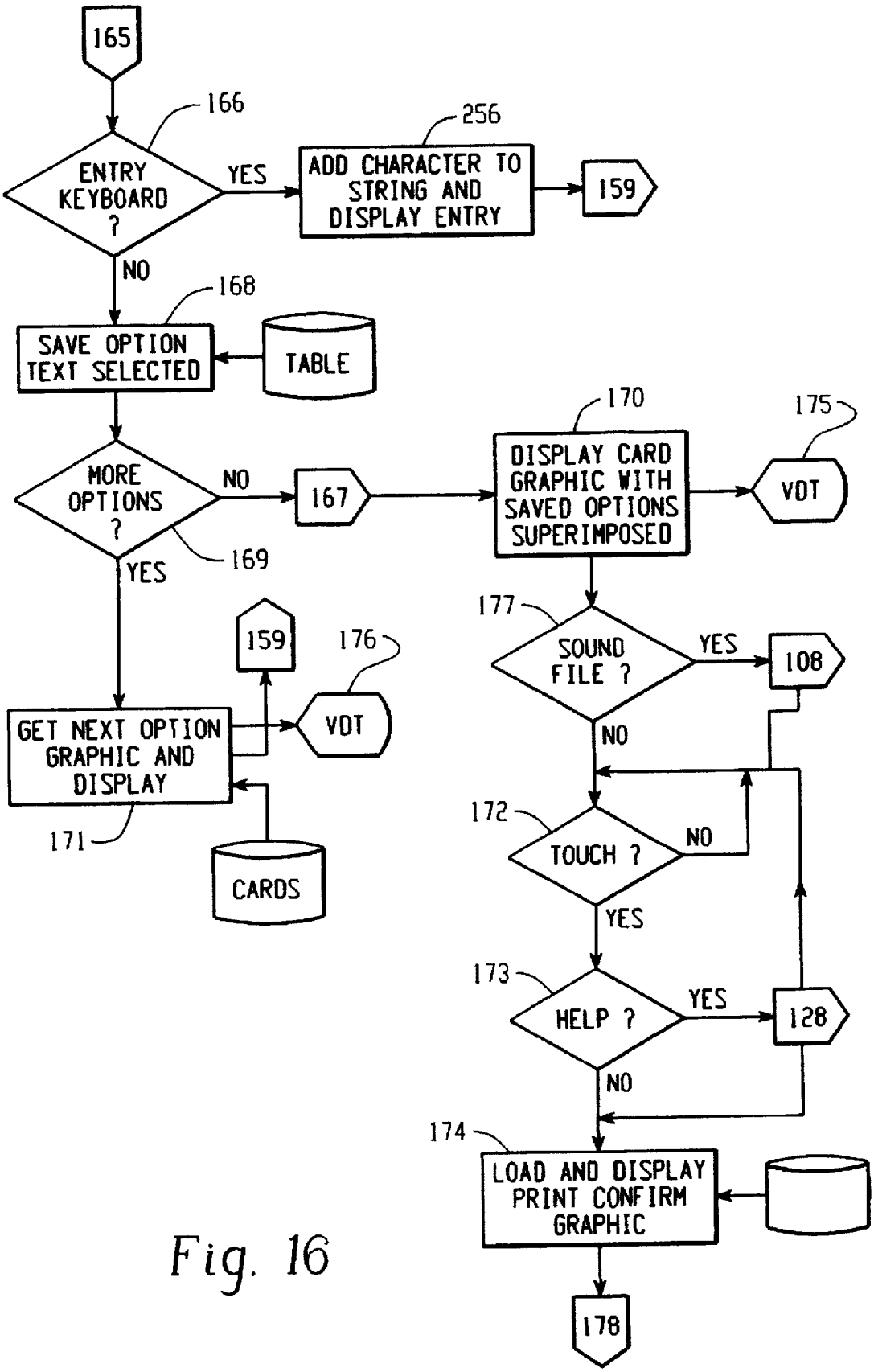
Figure 17:
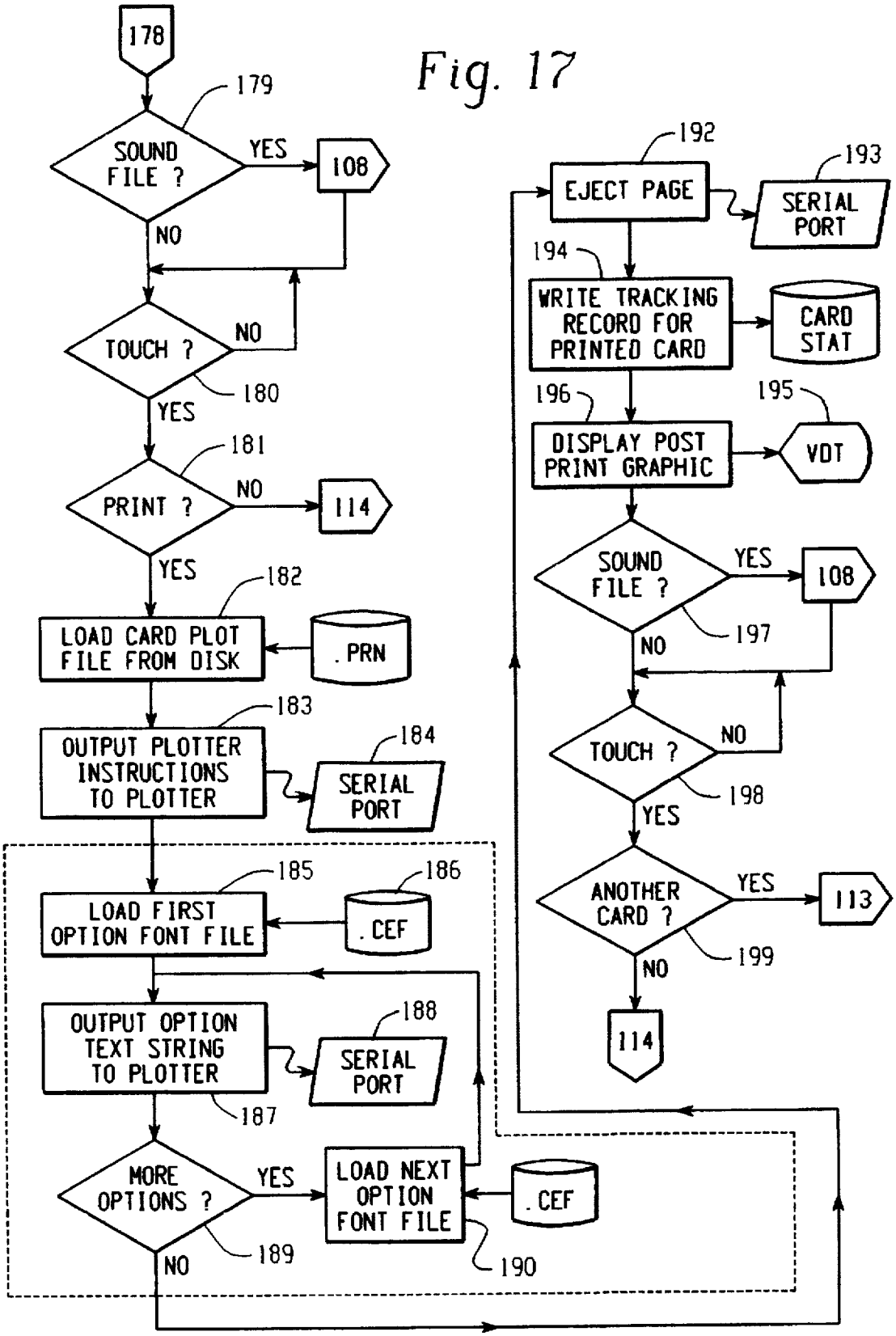

At step 151 in FIG. 15, the system elicits and stores the chosen card's defined customization options. Depending on the presented screen display, the customer may enter a string of test of maximum 10 to 80 characters in length. Expansion beyond 80 characters may be provided as an option based on fonts and space allocation on the card product to be printed.

Additionally, numbers may be entered at this level for dates, age, years married, etc., depending on the application chosen. These entries may be processed in a manner similar to the above screen level selections. The button touched defines an action code that is cross-referenced to a description in a database file. When the button is selected, the program accesses the file, retrieves the description associated with the action code and holds it in memory along with the text that has been entered.

The text/number entry screens have a button defined for informing the system that the customer has completed the specific entry and to go on to the next option ("OK to Proceed" button on FIG. 10). At any point during the entry/selection of options, the customer may back up to any prior option to change or modify any entry made at that point.

After all the customization information has been entered at this level, the card is then re-displayed on the monitor with all the customer entries and selections overlayed onto the card in the proper locations for final customer approval as shown in FIG. 11. A customer may choose to print the selected card. As the system may be operated for any length of time up to this point without incurring a charge, a confirmation of printing is asked for in step 174.

To plot the selected card, the system, in step 182, loads from the hard disk 76 the plotter instructions for the card. These instructions are then output to the plotter 24 from a serial or parallel port installed in the computer 56. After the stored card data has been plotted on the card, the customization steps optionally may be overlayed. For each customer text or number entry, an appropriate plotter font file is opened and a character string is output to the plotter. When all the card customizing entries and selections have been reproduced, the card sheet is then ejected from the printer 58. If desired, the program for plotting the selected card can require receipt of the proper payment via payment receiving device 62 (FIG. 1) prior to activation.

The customer is then given the option to print another card. If they wish to, the system then returns to the occasion selection screen at entry point 113 in FIG. 12, and if not, it returns to the marketing cycle display at entry point 114.

Figure 12A:
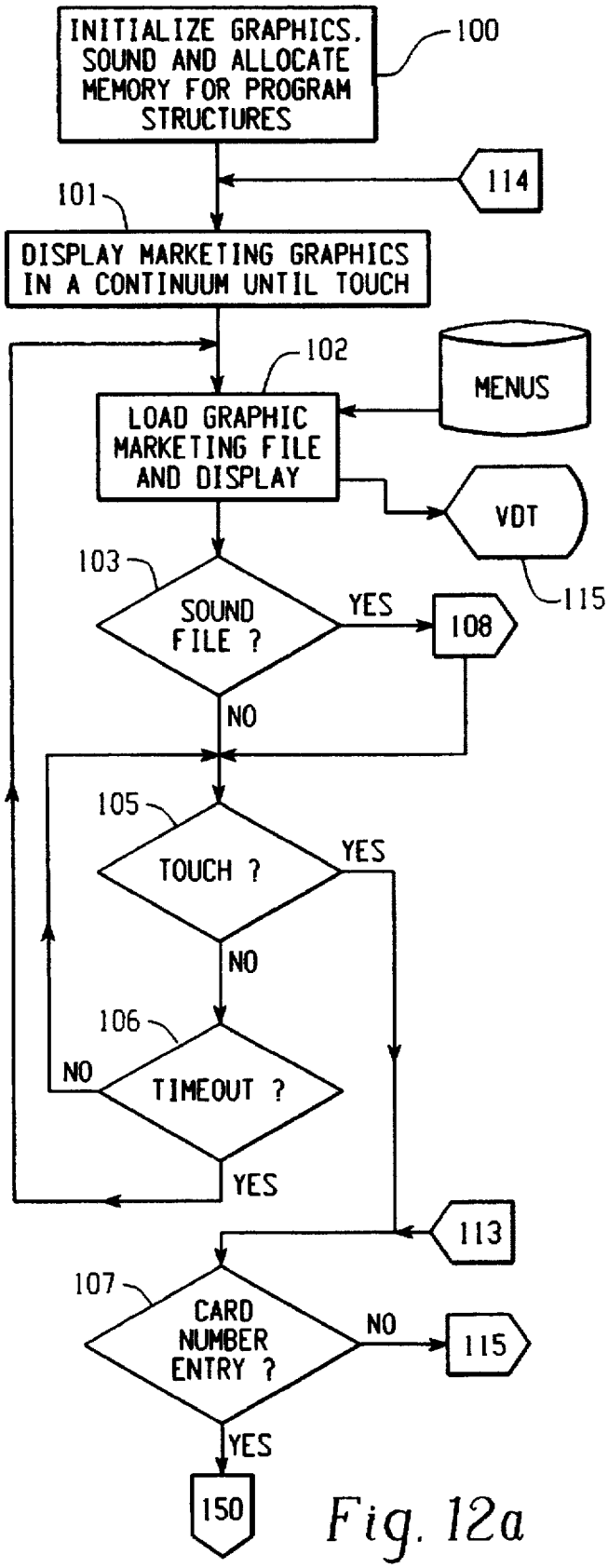
FIGS. 12–23 is a flow diagram of the card selection, customization and printing process.
Figure 12B:
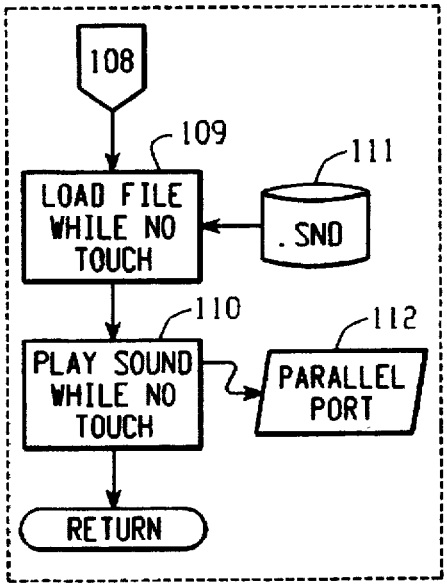
Figure 18:
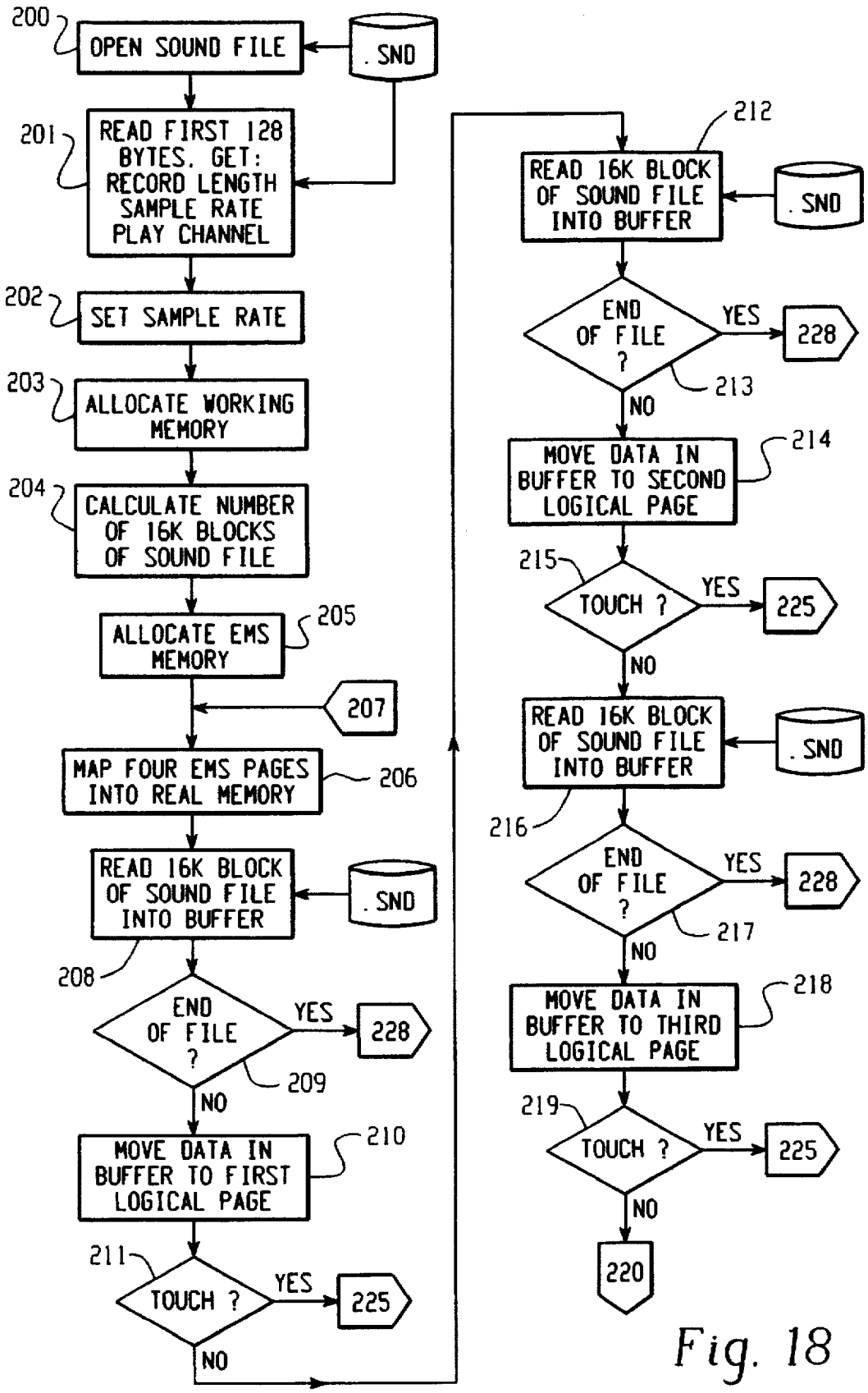
Figure 19A:
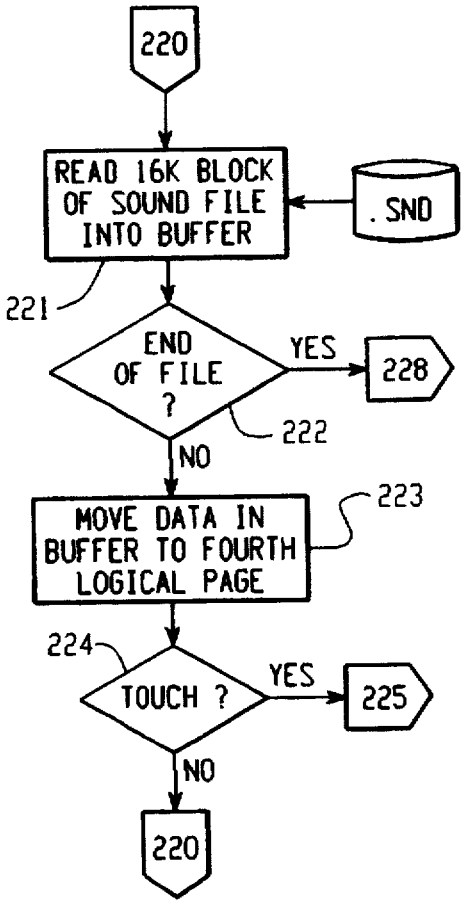
Figure 19B:
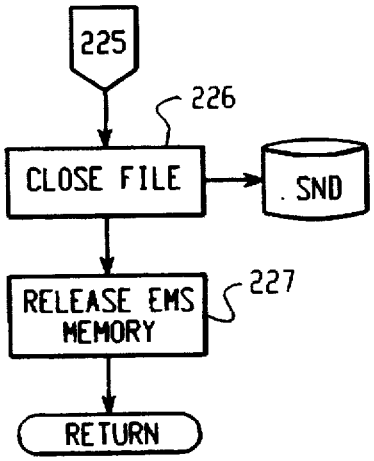
Figure 19C:
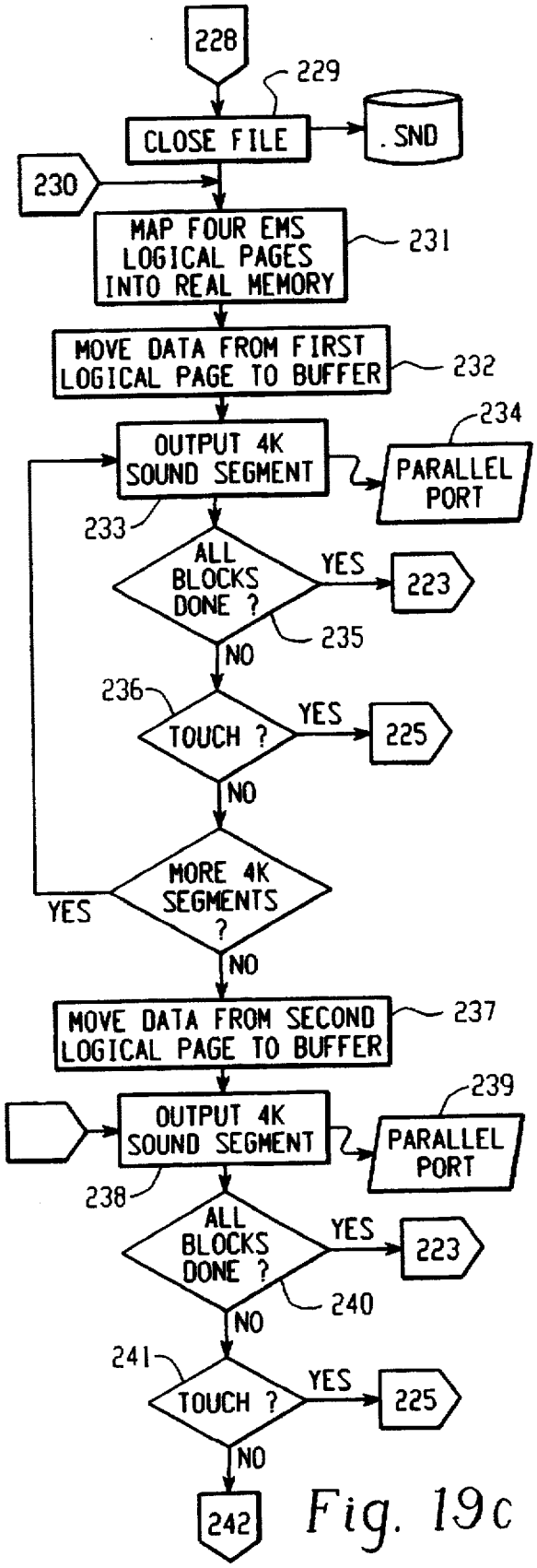
Figure 20A:
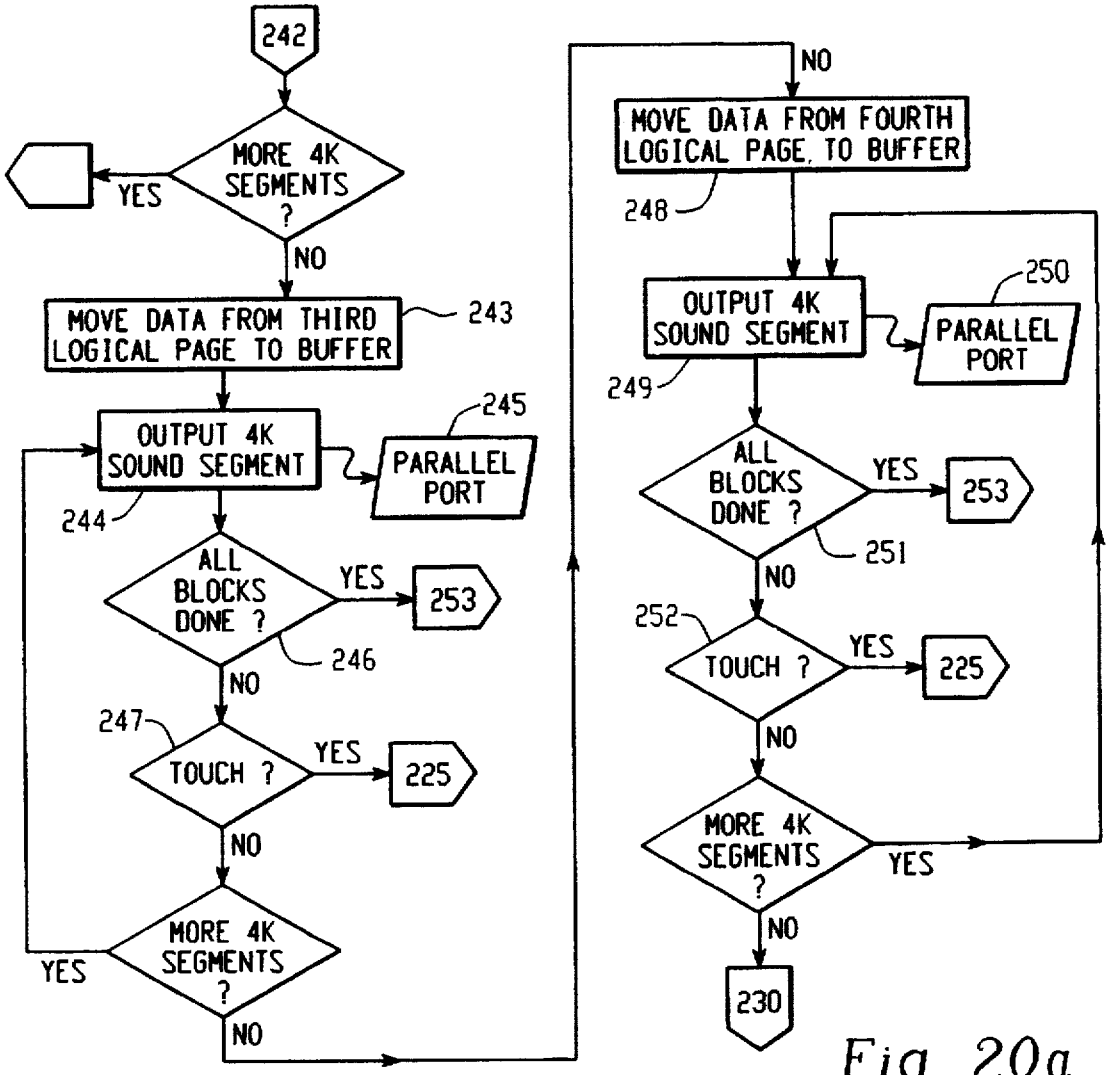
Figure 20B:
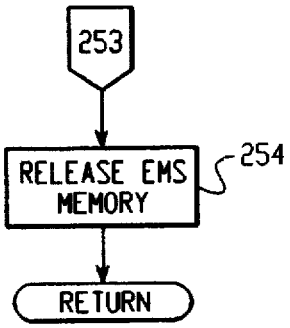
Figure 21A:
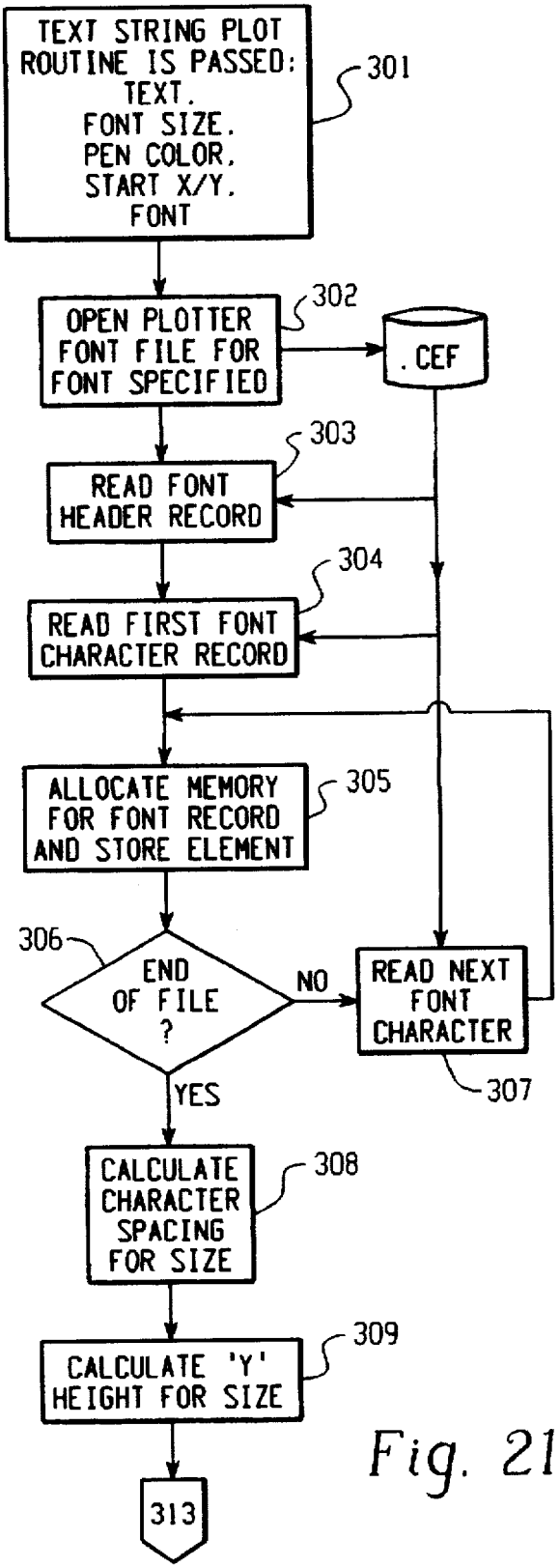
Figure 21B:
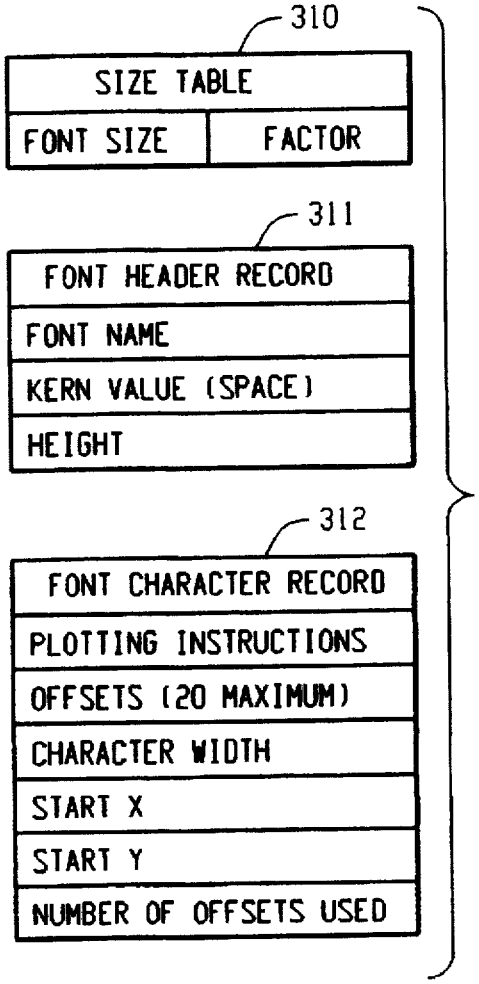
Figure 22:
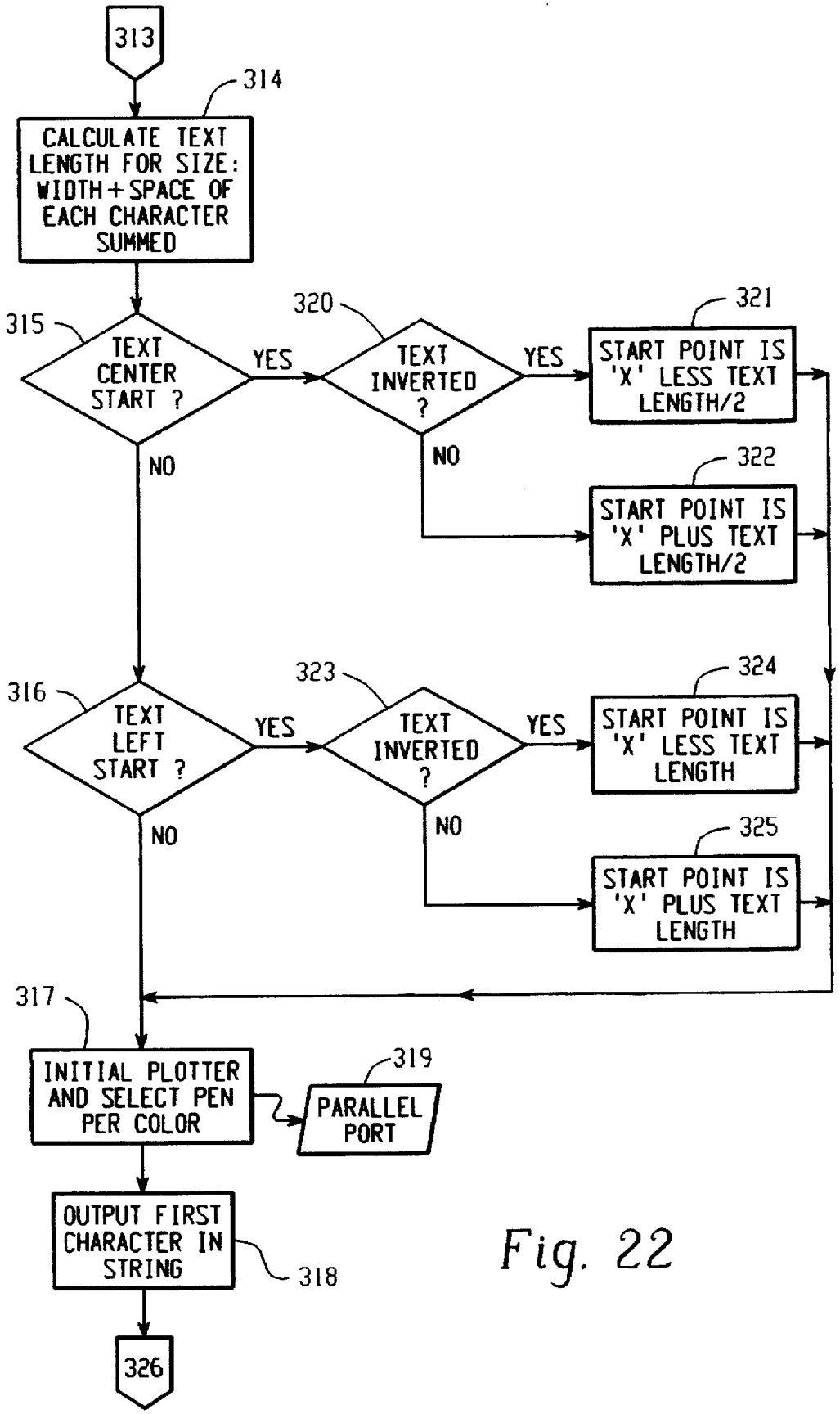
Figure 23A:
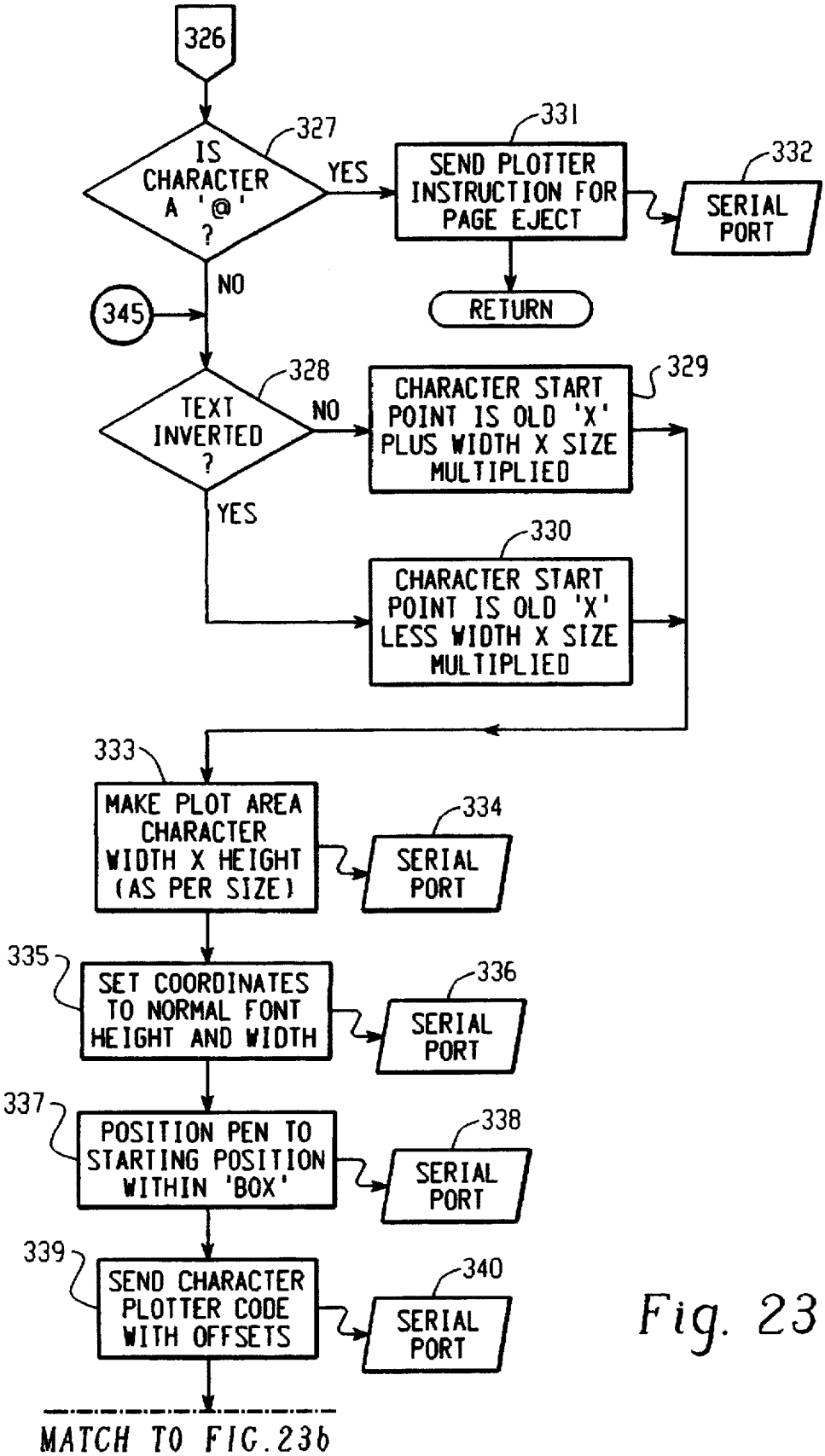
Figure 23B:
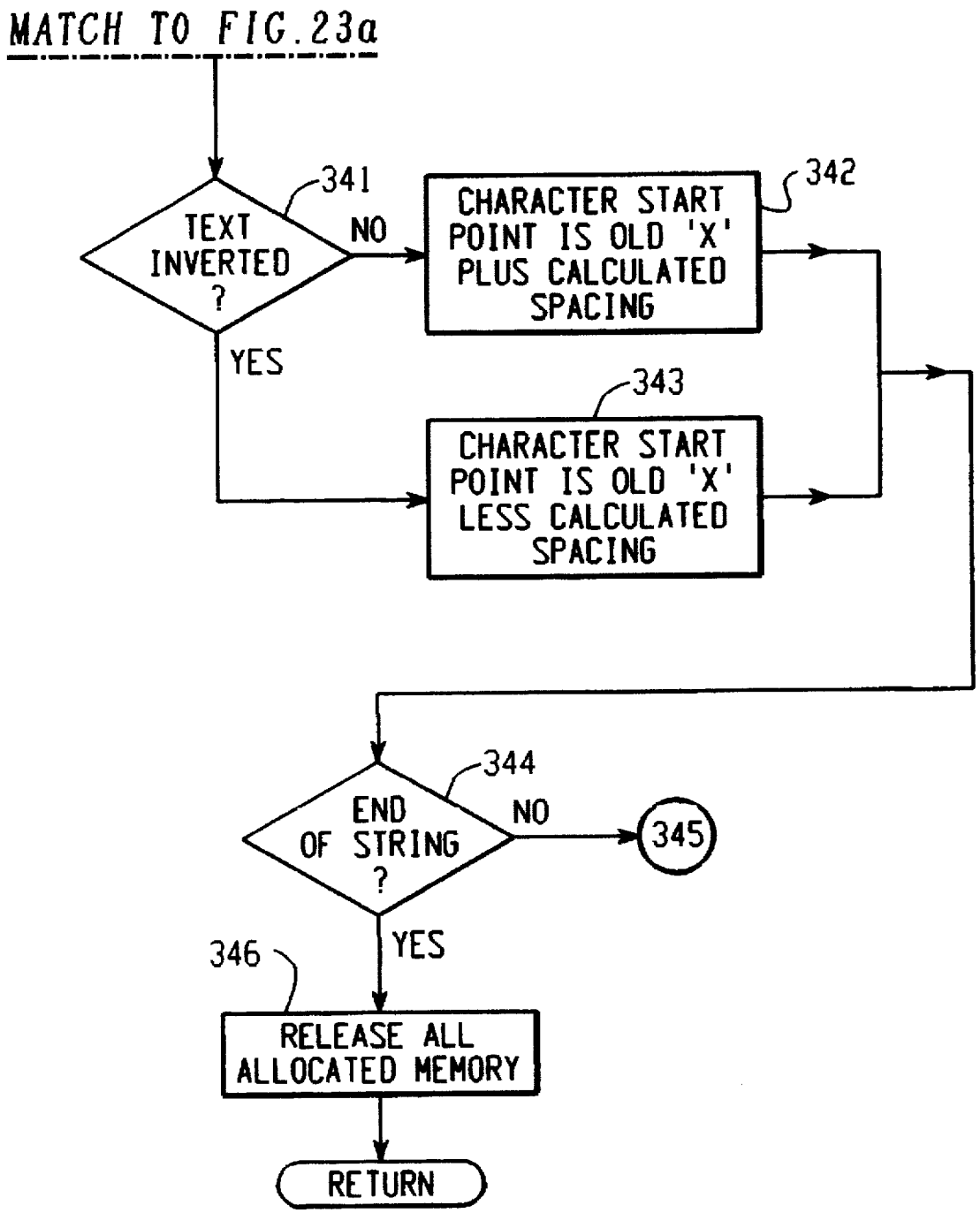

FIGS. 18–20 show a detail flow of the sound processing routine depicted by blocks 109–112 in FIG. 12. The routine begins at step 200 by opening the sound file and reading in the first 128 positions to retrieve the record length of the digital sound data, the recording sample rate, and channel to play it through. The sample rate is then set in step 202. Program memory is allocated to use a buffer as each sound file block is read from the file. By using the record length, a number of 4K blocks may be calculated for use during the sound file playback. To accommodate a sound file of any size, the present system stores the file in Expanded Memory (EMS). This is additional memory that is outside the system's normally accessible memory area. It is accessed by mapping 64K segments of the stored data into RAM 66 (step 206). Each of these 64K segments of data are further subdivided into sixteen 4K blocks. The computer 56 downloads the data one block at a time into RAM 66. To provide touch interrupt capability, the program checks for a valid touch after each 4K block of sound data is read (steps 211, 215, 219 and 224). When all sixteen blocks of a segment have been downloaded that segment is moved into EMS and another 64K segment is mapped into program useable memory. This process is continued until the entire file is read or a touch is detected. If a touch is detected, the routine closes the file and releases the EMS memory before returning to the routine's origin (FIG. 19).

If no touch on the monitor screen is detected during the file loading process, the file is then closed and the system prepares to playback the stored speech data. The system, starting at the beginning of the sound file stored in EMS, begins mapping the data into the RAM 66. Each 4K block is moved into the data buffer and played back through audio component 60 attached to the parallel port of the computer 56. As in the reading of the file, after each 4K block is played back, a valid touch is checked for. If at any point a touch is detected or the number of blocks played is equal to the calculated block count, the routine ends by releasing the EMS memory and returning to its starting point.

Figure 24A:
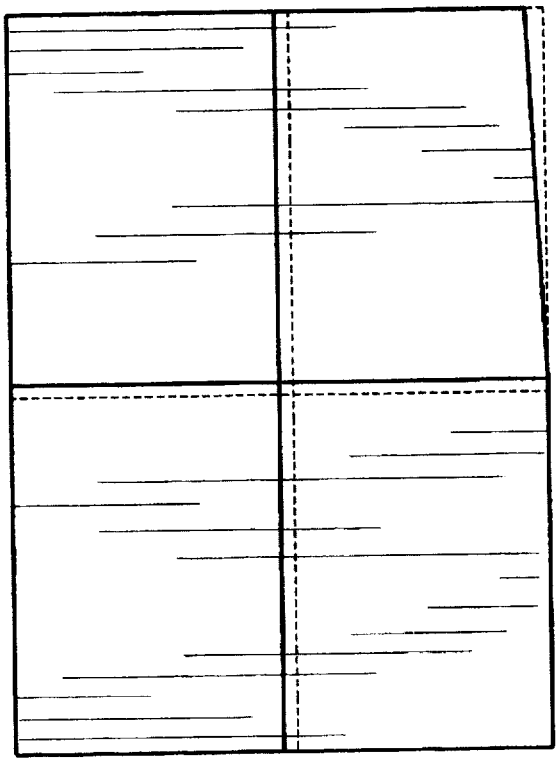
FIGS. 24*a, b,* and *c* show a plain card stock with pre-scored fold lines and a trimmed edge, as well as, the folding sequence.
Figure 24B:
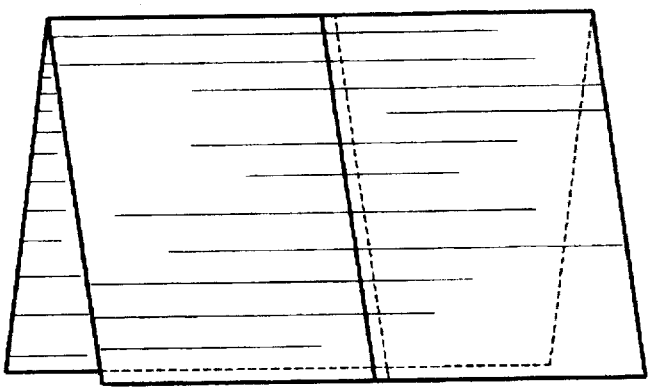
Figure 24C:
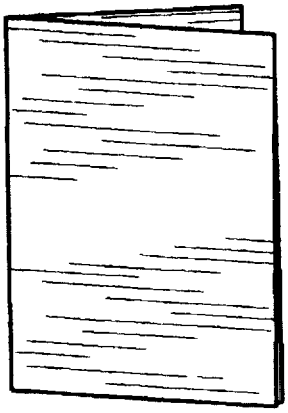

Upon completion of the printing process and when the printed card is ejected from terminal 50, it may be a flat sheet of card stock having quadrants 78, 80, 82 and 84 clockwise from the upper left quadrant as shown in FIG. 24*a*. All the printing is done on one side of the flat card stock. Therefore, the card is folded twice in a predetermined manner so as to produce a card having print on both the inside and outside of the card. The card is intended to be folded such that quadrants 82, 80, 78 and 84 form the front, first page, second page and back, respectively. This may be accomplished by first folding the top half (i.e., quadrants 78 and 80) about a horizontal axis down behind the bottom half (i.e., quadrants 84 and 82) as shown in FIG. 24*b*. Next, the left half (i.e., with quadrant 84) is folded about a vertical axis to be behind the right side, as shown in FIG. 24*c*. Once the card has been folded as such, it may be placed in an envelope available from a compartment on or adjacent to terminal 50. The printer 58 prints the cards such that print appearing on quadrant 78 and 80 is inverse, or up-side-down from the print appearing on quadrant 82 and 84. Thus, when the card is folded as described above, all the print appears uniformly oriented to be right-side-up.

As it is desirable to have the edges of the card aligned when folded, the card may have prescored lines along the vertical and horizontal axes to indicate and facilitate folding along these lines. However, if the prescored lines were located along the central horizontal and vertical axes, the edges of interior pages, quadrants 78 and 80, would protrude slightly due to the thickness of the paper. Therefore, to compensate for the thickness of the paper, the prescored lines may be located slightly off from and parallel to the exact central vertical and horizontal axes. Additionally, the right vertical edge of quadrant 80 may be slightly tapered as seen on FIG. 24*a*. The amount of the taper depends on the thickness and size of the paper and the amount of offset of the prescored lines from the center axes. For example, it may be seen that a card of sheet stock 80 # text, having a vertical length of 17 inches and a horizontal width of 11 inches (as in conventional greeting cards), when folded according to the method described above, has edges which align with each other when the card contains a prescored vertical line 1/16th inch to the left of the central vertical axis, a prescored horizontal line 1/16th inch above the central horizontal axis, and the right vertical edge of quadrant 80 tapered 1/16th of an inch.

Although the invention has been described in detail herein, it should be understood that the invention is not limited to the embodiments herein disclosed. Various changes, substitutions and modifications may be made thereto by those skilled in the art without departing from the spirit or scope of the invention defined by the appended claims.

We claim:

1. A vending machine method for dispensing printed card products at a terminal area, including the steps of:

creating card product designs in a digital format;

compressing said card product designs to provide designs in compressed format;

storing said designs in compressed format in memory at said terminal area;

selecting a desired one of said card product designs at said terminal area;

decompressing the design in compressed format to print the selected card product design at said terminal area.

2. A vending machine method for dispensing printed card products according to claim 1 wherein:

compressing of said card product designs is achieved by conversion into a vector format, and decompression is achieved by using a plotter to print the selected card product design using card product design in vendor format.

3. A vending machine method for dispensing printed card products according to claim 1 wherein said compression and decompression is achieved using a digital cosign transform (DCT).

4. A vending machine method for dispensing printed card products according to claim 1 wherein selection of a desired one of said product designs is achieved by selecting criteria for the desired product design and displaying a selected group of card product designs for final selection for printing.

5. A vending machine method for dispensing printed card products according to claim 4 wherein said display of a selected group of card product designs is achieved by decompressing card product designs and displaying the decompressed card product design on a video screen at the terminal area.

6. A vending machine method for dispensing printed card products according to claim 4 wherein, after final selection of a card product design, customized messages may be added to the selected design, said customized messages being displayed as an overlay to the selected card product design and being printed as an overlay on the printed card product.

7. A vending machine method for dispensing printed card products at a terminal area, including the steps of:

creating card product designs including graphics, text, and blank spaces for insertion of customized messages;

storing said card product designs in memory at said terminal area together with selection criteria for each card product design;

selecting a desired one of said card product designs for display on a screen at said terminal area;

providing a screen overlay for the displayed card product indicating the types of customized messages that can be inserted in the blank spaces;

inserting customized messages at said terminal area and displaying said customized messages as an overlay on said card product design displayed on said screen; and printing the selected card product design with said customized messages if satisfied with the card design displayed on said screen.

8. A vending machine method according to claim 7 wherein said printing is achieved by printing said card product design including graphics, text and blank spaces and printing of said customized messages in said blank spaces as an overlay.

9. A vending machine method according to claim 8 wherein said selection of a desired one of said product designs is achieved by first selecting a desired general application, then selecting specific uses appropriate for the selected general application, then displaying product designs corresponding to the selected general application and selected specific uses, and then selecting a specific product design from among the displayed product designs.

10. A vending machine method according to claim 7 wherein said card product designs are stored in memory in a compressed format for decompression when used to provide card product design displays or printed images.

11. A vending machine method for dispensing printed card products at a terminal area including the steps of:

providing a plurality of stored card product designs together with at least one general application and specific uses for each card product design;

selecting a group of card product designs at said terminal area corresponding to a desired general application;

displaying specific use options corresponding to the selected general application;

selecting specific uses from the displayed specific use options;

displaying the card designs corresponding to the selected general application and the selected specific uses;

selecting a specific one of said displayed card formats;

adding custom messages to the selected card format to customize the card as desired; and printing said selected card format with said custom messages when satisfied with the customized card selection.

12. A vending machine method according to claim 11, wherein said stored product designs are stored as compressed data.

13. A vending machine method according to claim 11, including providing a video monitor at said terminal area for presenting textual and graphic design screens relating to the creation and production of said selected card format with said custom messages, and allowing the customer to make desired responses and selections via a touch sensitive screen on the monitor.

14. A vending machine method according to claim 13, including reproducing voice text data associated with said textual and graphic design screens.

15. A vending machine method according to claim 13, including enabling the customer to customize said selected card format by displaying text characters on the touch sensitive screen of the monitor, and allowing a customer to enter a desired character string by touching selected ones of the text characters as displayed on the touch sensitive screen.

16. A vending machine method according to claim 13, including enabling the customer to customize said selected card format by displaying text characters on the touch sensitive screen of the monitor, and allowing a customer to enter a desired character string by touching selected ones of the text characters as displayed on the touch sensitive screen.

17. A vending machine method according to claim 11, including revising and updating said stored card product designs from a remote location via a communications link.

18. A vending machine method according to claim 11, including printing said selected card format with said custom messages on a recording medium with a multi-color ink plotter at the terminal.

19. A vending machine method according to claim 11, including printing said selected card format with said custom messages on one side of a flat sheet of card stock material, and folding the card stock material along prescored fold lines to produce a finished card product.

20. A vending machine method for dispensing printed card products at a terminal area including the steps of:

providing a plurality of different card formats in a memory together with selection criteria;

providing multi level menu displays of said selection criteria so that the customer can select a group of said card formats;

successively displaying the card formats corresponding to said selected criteria for final selection of a card format;

eliciting further information from said customer for customizing said selected card format;

printing said customized card format on a plain paper card stock if desired by the customer; and paying for said customized card only if printed.

21. Vending machine apparatus for dispensing printed cards at a terminal area comprising a memory for storing a plurality of different card formats together with selection criteria for each of said card formats;

a video screen at the terminal area visible by customers for displaying multi-level selection criteria menu displays and selected card formats;

a touch screen associated with said video screen to permit customer selection of criteria displayed on said video screen;

means for sorting said card formats stored in said memory and displaying on said video screen those card formats corresponding to selected criteria;

means coupled to said touch screen for selecting one of said displayed card formats;

means coupled to said touch screen for supplying customized messages appropriate for the selected card format; and a printer for printing the selected card format with said customized messages.

22. A vending machine method according to claim 21, wherein said stored card formats are stored as compressed data.

23. A vending machine method according to claim 21, including revising and updating said stored card formats from a remote location via a communications link.

24. A vending machine method according to claim 21, including printing said selected card format with said customized messages on a recording medium with a multi-color ink plotter at the terminal.

25. A vending machine method according to claim 21, including printing said selected card format with said customized messages on one side of a flat sheet of card stock material, and folding the card stock material along prescored fold lines to produce a finished card product.

26. A vending machine method according to claim 21, including reproducing voice text data associated with a display on said video screen.

27. Vending machine apparatus for dispensing printed cards at a terminal area comprising;

a memory for storing a plurality of different card formats together with selection criteria for each of said card formats;

a video screen at the terminal area visible by customers;

means for displaying a multi-level selection menu of said selection criteria on said video screen;

means available to the customer for making selections from said multi-level selection menu;

means for sorting said card formats in said memory according to selected criteria and for displaying those of said card formats corresponding to selected criteria on said video screen;

means for making a final card format selection from among those displayed on said video screen;

means for supplying customized messages to be added to the final card format selections;

means supplying plain paper stock prescored to provide a quadrant fold;

means for printing said customized card format on a single side of said plain paper stock so that, when folded, print appears both on an outside cover and on at least one inside page.

28. A vending machine for dispensing printed, customized card products, comprising:

(a) a housing, (b) a card delivery device at least partially disposed in the housing;

(c) a computer disposed in the housing, said computer having a card design file with a plurality of card designs stored therein, each card design having a plurality of social expression design parameters associated therewith;

(d) an input device and a display terminal, each coupled with said computer and each supported at least partially on said housing, said input device being accessible to a customer on the outside of said housing, and said display terminal being viewable by a customer on the outside of said housing;

(e) said input device being designed to enable a consumer to respond to a plurality of queries presented at the display terminal to input to the computer a plurality of input signals, each of which is associated with a social expression design parameter, for use in searching the card design file;

(f) said computer being adapted to (i) search the card design file in accordance with said plurality of input signals and retrieve a group of the card designs, each of whose plurality of social express design parameters is associated with said plurality of input signals, and (ii) sequentially display each of the group of card designs at said display terminal for final selection by a customer on the outside of said housing, (g) said input device being further designed to input additional signals for defining customized material for addition to a selected card design; and (h) a printing machine disposed in the housing, said printing machine having a paper storage device for storing a stack of paper products, a printing device responsive to a signal from said computer for printing on one of the stack of paper products a selected card design and the customized material defined for the card design and for directing the one of the stack of paper products from said printing device to said card delivery device.

29. A vending machine as defined in claim 28, wherein one of the stack of paper products is located at said printing device while a plurality of the input signals is being input to said computer, and wherein said printing machine includes a feed device for automatically feeding another one of the stack of paper products to said printing device after said one of said stack of paper products has been directed from said printing device to said card delivery device.

30. A machine for delivering a personalized product to a customer, said machine comprising:

(a) storage means for storing base products;

(b) a delivery device;

(c) product handling means for effecting a series of operations and including:

(i) transfer means for effecting transfer of a base product from said storage means;

(ii) electrically controllable modification means for effecting modification of said base products to produce modified base products; and (iii) delivery means for effecting delivery of said modified base products to said delivery device;

(d) an enclosure containing said storage means, said delivery device, and said product handling means therewithin;

(e) selection means operable by a customer on the outside of said enclosure to effect entry of control data which defines the desired final form of the personalized product; and (f) computer means within said enclosure and coupled to said selection means and to said transfer means, said electrically controllable modification means, and said delivery means of said product handling means, said computer means controlling said transfer means, said modification means, and said delivery means of said product handling means to perform a series of operations in accordance with said control data, said series of operations being performed within said enclosure without operator intervention and including modification of a base product transferred from said storage means to produce the desired final form of the personalized product, and delivery of the desired final form of the personalized product from said modification means to said delivery device, (g) wherein said selection means includes display means arranged for display of the product formats available for selection and personalization by a customer.

31. A machine as defined in claim 30, wherein said selection means comprises electronically generated presentation means for presentation of the product formats available for selection and personalization by a customer.

32. A machine as defined in claim 30, wherein said base products include base products in the form of sheets of sheet material and wherein said modification means of said product handling means include printing means for printing personalized data on said base products.

33. A machine as defined in claim 32, wherein said printing means includes an automatic plotter.

34. A machine as defined in claim 30, wherein said storage means include means for storing a stack of base products in the form of sheets of sheet material and wherein said product handling means comprises means for engagement with a leading sheet of said stack to effect separation of the leading sheet from remaining sheets of said stack.

35. A machine as defined in claim 30, further including start means coupled to said computer means for initiating performance of said series of operations in accordance with said control data.

36. A machine as defined in claim 35, including payment means to effect payment for a product.

37. A machine as defined in claim 30, wherein said base products include sheets of greeting card stock, and wherein said modification means include means for applying indicia to a transferred sheet of greeting card stock to form a personalized greeting card.

38. A machine as defined in claim 37, wherein said modification means include means for applying message indicia of a selectable form to a transferred sheet of greeting card stock, and wherein said selection means include means for selecting the form of message indicia to be applied to a transferred sheet of greeting card stock.

39. A machine as defined in claim 38, wherein said selection means includes means for selecting characters from a complete alphabet for composition of the form of message indicia to be applied to a transferred sheet of greeting card stock.

40. A machine as defined in claim 39, wherein said display means include a touch screen and a complete alphabet display associated therewith for selection of the form of message indicia to be applied to a transferred sheet of greeting card stock.

41. A machine as defined in claim 37, wherein said base products include blank sheets of greeting card stock, and wherein said modification means include means for applying graphic indicia to a transferred sheet of greeting card stock in forming a personalized greeting card.

42. A machine as defined in claim 30, wherein said display means include a touch screen and an associated monitor for display and selection of said product formats available for selection and personalization by a customer and for display of operating instructions.

43. A machine as defined in claim 42, further including audio means for providing operating instructions and indications to a customer.

44. Apparatus for the on-site reproduction and vending of social expression cards in response to a plurality of input data set items provided by a customer, comprising:

information storage and retrieval means for storing, referencing, and retrieving a plurality of social expression card designs, each of said social expression card designs being identified by a plurality of special occasion parameters;

querying means for querying the customer to select from among the plurality of input data set items, where all of said plurality of input data set items are special occasion parameters that identify types of social expression card designs;

display means for displaying those social expression card designs that have special occasion parameters that match those special occasion parameters selected by the customer;

reproducing means for reproducing social expression card designs in tangible form; and control means connected to said information storage and retrieval means, querying means, display means, and reproducing means for controlling and coordinating the operation thereof.

45. Apparatus for the on-site reproduction and vending of social expression cards in response to a plurality of input data set items provided by a customer, comprising:

information storage and retrieval means for storing, referencing, and retrieving a plurality of social expression card designs, each of said social expression card designs being uniquely identified by a plurality of special occasion parameters;

querying means for querying the customer to select from among the plurality of input data set items, where all of said plurality of input data set items are special occasion parameters that identify types of social expression card designs;

display means for displaying those social expression card designs that have special occasion parameters that match those special occasion parameters selected by the customer;

reproducing means for reproducing social expression card designs in tangible form; and control means connected to said information storage and retrieval means, querying means, display means, and reproducing means for controlling and coordinating the operation thereof.

46. An apparatus as set forth in either of claims 44 or 45, wherein said control means is adapted to gather statistical and accounting data with respect to the operation of the apparatus.

47. The apparatus of either of claims 44 or 45, further comprising valuable media accepting means connected to said control means for accepting payment from the customer for reproduced social expression cards.

48. The apparatus of either of claims 44 or 45, wherein the querying means comprises input means connected to said control means for accepting input of the plurality of input data set items, and query display means for displaying queries for the plurality of input data set items.

49. The apparatus of claim 48, wherein the query display means and input means comprises respectively a video display and a touchscreen.

50. The apparatus of claim 48, wherein the query display means and the display means are combined.

51. The apparatus of either of claims 44 or 45, wherein the display means comprises video display for electronically displaying greeting card designs.

52. The apparatus of either of claims 44 or 45, wherein the reproducing means comprises a printer.

53. Apparatus for the on-site reproduction of social expression cards, said apparatus comprising:

(a) information storage and retrieval means for storing, referencing, and retrieving a plurality of social expression card designs, each of said social expression card designs being retrievable by a customer's selection of a plurality of special occasion parameters that identify types of social expression card designs;

(b) query means for querying the customer to select from among the plurality of special occasion parameters;

(c) display means for displaying a subset of the plurality of social expression card designs in response to the customer's selection from among the plurality of special occasion parameters; and (d) control means for controlling said information storage and retrieval means, said querying means, and said display means.

54. Apparatus for the on-site reproduction of social expression cards, said apparatus comprising:

(a) information storage and retrieval means for storing, referencing, and retrieving a plurality of social expression card designs, each of said social expression card designs being retrievable by a customer's selection of a plurality of special occasion parameters that identify types of social expression card designs;

(b) query means for querying the customer to select from among the plurality of special occasion parameters;

(c) display means for displaying a subset of the plurality of social expression card designs in response to the customer's selection from among the plurality of special occasion parameters; and (d) reproducing means for reproducing social expression card designs in tangible form; and (e) control means for controlling said information storage and retrieval means, said querying means, said display means, and said reproducing means.

55. Apparatus for the on-site reproduction of social expression cards in response to a plurality of input data set items provided by a customer, comprising:

(a) information storage and retrieval means for storing, referencing, and retrieving a plurality of social expression card designs, each of said social expression card designs being identified by a plurality of special occasion parameters;

(b) querying means for querying the customer to select from among the plurality of input data set items, where all of said plurality of input data set items are special occasion parameters that identify types of social expression card designs;

(c) display means for displaying those social expression card designs that have special occasion parameters that match those special occasion parameters selected by the customer; and (d) control means connected to said information storage and retrieval means, querying means, and display means for controlling and coordinating the operation thereof.

56. Apparatus for the on-site reproduction of social expression cards in response to a plurality of input data set items provided by a customer, comprising:

(a) information storage and retrieval means for storing, referencing, and retrieving a plurality of social expression card designs, each of said social expression card designs being identified by a plurality of special occasion parameters;

(b) querying means for querying the customer to select from among the plurality of input data set items, where all of said plurality of input data set items are special occasion parameters that identify types of social expression card designs;

(c) display means for displaying those social expression card designs that have special occasion parameters that match those special occasion parameters selected by the customer;

(d) reproducing means for reproducing social expression card designs in tangible form; and (e) control means connected to said information storage and retrieval means, querying means, display means, and reproducing means for controlling and coordinating the operation thereof.

57. Apparatus for the on-site reproduction of social expression cards, said apparatus comprising:

(a) querying means for querying a customer to select from among a first plurality of special occasion parameters that identify types of social expression card designs;

(b) information storage and retrieval means for storing, referencing, and retrieving a first plurality of social expression card designs, each of said social expression card designs being retrievable by the customer's selection of a second plurality of special occasion parameters that is a subset of said first plurality of special occasion parameters;

(c) display means for displaying a second plurality of social expression card designs that is a subset of a said first plurality of social expression card designs in response to the customer's selection from among said first plurality of special occasion parameters; and (d) control means for controlling said information storage and retrieval means, said querying means, and said display means.

58. Apparatus for the on-site reproduction of social expression cards, said apparatus comprising:

(a) querying means for querying a customer to select from among a first plurality of special occasion parameters that identify types of social expression card designs;

(b) information storage and retrieval means for storing, referencing, and retrieving a first plurality of social expression card designs, each of said social expression card designs being retrievable by the customer's selection of a second plurality of special occasion parameters that is a subset of said first plurality of special occasion parameters;

(c) display means for displaying a second plurality of social expression card designs that is a subset of the plurality of social expression card designs in response to the customer's selection from among said first plurality of special occasion parameters; and (d) reproducing means for reproducing social expression card designs in tangible form; and (e) control means for controlling said information storage and retrieval means, said querying means, said display means, and said reproducing means.

59. A method of the on-site manufacture and vending of social expression cards, comprising the steps of:

inputting a plurality of social expression card designs into an information storage and retrieval system for storing, referencing, and retrieving the social expression card designs, where each of the social expression card designs comprises a front page and an inside page and each social expression card design is uniquely identified by a plurality of special occasion parameters, and where the special occasion parameters are used to group social expression card designs with like special occasion parameters into fields;

querying the customer for a plurality of input data set items, all of the plurality of input data set items being special occasion parameters to identify a field of social expression card designs;

searching the information storage and retrieval system for social expression card designs having special occasion parameters that match those input by the customer;

displaying those social expression card designs haviang special occasion parameters that match those input by the customer;

selecting a social expression card design to be reproduced; and reproducing said selected social expression card design in tangible form.

60. A method of the on-site manufacture and vending of social expression cards, comprising the steps of:

inputting a plurality of social expression card designs into an information storage and retrieval system for storing, referencing, and retrieving the social expression card designs, where each of the social expression card designs comprises a front page and an inside page and each social expression card design is identified by a plurality of special occasion parameters, and where the special occasion parameters are used to group social expression card designs with like special occasion parameters into fields;

querying the customer for a plurality of input data set items, all of the plurality of input data set items being special occasion parameters to identify a field of social expression card designs;

searching the information storage and retrieval system for social expression card designs having special occasion parameters that match those input by the customer;

displaying those social expression card designs having special occasion parameters that match those input by the customer;

selecting a social expression card design to be reproduced; and reproducing said selected social expression card design in tangible form.

61. The method of either of claims 59 or 60, further including the step of gathering statistical and accounting data with respect to the manufacture and vending of social expression cards.

* * * * *